US010892543B2

(12) United States Patent
Vermes et al.

(10) Patent No.: US 10,892,543 B2
(45) Date of Patent: *Jan. 12, 2021

(54) RADIATING CLOSURES

(71) Applicant: CenturyLink Intellectual Property LLC, Broomfield, CO (US)

(72) Inventors: Jonathan J. Vermes, Onalaska, WI (US); Thomas Schwengler, Lakewood, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/909,182

(22) Filed: Jun. 23, 2020

(65) Prior Publication Data
US 2020/0321685 A1 Oct. 8, 2020

Related U.S. Application Data

(63) Continuation of application No. 16/395,018, filed on Apr. 25, 2019, now Pat. No. 10,700,411, which is a
(Continued)

(51) Int. Cl.
*H04B 1/38* (2015.01)
*H01Q 1/22* (2006.01)
(Continued)

(52) U.S. Cl.
CPC ......... *H01Q 1/2291* (2013.01); *G02B 6/4451* (2013.01); *G02B 6/4459* (2013.01);
(Continued)

(58) Field of Classification Search
CPC ..... H04W 84/18; H04W 88/02; H04W 88/06; H01Q 1/42; H01Q 1/2291; H01Q 9/0407;
(Continued)

(56) References Cited

U.S. PATENT DOCUMENTS 2,754,101 A 7/1956 Haworth et al.
4,034,567 A 7/1977 Roggen
(Continued)

FOREIGN PATENT DOCUMENTS

CA 2337284 8/2002
CN 101799987 B 11/2011
(Continued)

OTHER PUBLICATIONS

Abram, et al.; Center for Nondestructive Evaluation, Iowa State University, Ames, IA, USA; "Effect of relative humidity on the curing and dielectric properties of polyurethane-based composites"; 2005 Annual Report Conference . . . Phenomena; 4 pages.
(Continued)

*Primary Examiner* — Nhan T Le

(57) ABSTRACT

Novel tools and techniques are provided for implementing telecommunications signal relays, and, more particularly, to methods, systems, and apparatuses for implementing telecommunications signal relays using radiating closures (either aerial, below grade, and/or buried, etc.), or the like. In various embodiments, a signal distribution system, which might be disposed within a radiating closure, might receive a first communications signal. A wireless transceiver of the signal distribution system might send the first communications signal, via one or more wireless communications channels, to one or more devices that are external to the radiating closure. In some embodiments, antennas—which might comprise first antennas disposed within the radiating closure or second antennas embedded in a housing material of the radiating closure, or both—might direct the first communications signal that is sent from the wireless transceiver to the one or more devices. In some cases, IoT sensors may be implemented in the radiating closure.

18 Claims, 17 Drawing Sheets

Related U.S. Application Data continuation of application No. 15/392,069, filed on Dec. 28, 2016, now Pat. No. 10,276,921, which is a continuation-in-part of application No. 14/973,460, filed on Dec. 17, 2015, now Pat. No. 10,330,882, which is a continuation-in-part of application No. 14/517,574, filed on Oct. 17, 2014, now Pat. No. 10,613,284, said application No. 14/973,460 is a continuation-in-part of application No. 14/578,851, filed on Dec. 22, 2014, now Pat. No. 10,154,325, said application No. 14/973,460 is a continuation-in-part of application No. 14/316,676, filed on Jun. 26, 2014, now Pat. No. 9,780,433.

(60) Provisional application No. 62/395,033, filed on Sep. 15, 2016, provisional application No. 62/384,023, filed on Sep. 6, 2016, provisional application No. 62/188,100, filed on Jul. 2, 2015, provisional application No. 62/127,701, filed on Mar. 3, 2015, provisional application No. 61/893,034, filed on Oct. 18, 2013, provisional application No. 61/939,109, filed on Feb. 12, 2014, provisional application No. 61/874,691, filed on Sep. 6, 2013.

(51) Int. Cl.

| | | |
|---|---|---|
| *H01Q 9/04* | (2006.01) | |
| *G02B 6/44* | (2006.01) | |
| *G02B 6/50* | (2006.01) | |
| *H01Q 21/06* | (2006.01) | |
| *H04W 84/18* | (2009.01) | |
| *H02G 3/08* | (2006.01) | |
| *H04W 88/06* | (2009.01) | |

(52) U.S. Cl.
CPC ........... *G02B 6/4467* (2013.01); *G02B 6/504* (2013.01); *H01Q 9/0407* (2013.01); *H01Q 21/061* (2013.01); *G02B 6/4416* (2013.01); *G02B 6/4442* (2013.01); *G02B 6/4466* (2013.01); *H02G 3/083* (2013.01); *H04W 84/18* (2013.01); *H04W 88/06* (2013.01); *Y10T 29/49718* (2015.01); *Y10T 29/49826* (2015.01)

(58) Field of Classification Search
CPC .. G02B 6/4416; G02B 6/4442; G02B 6/4451; G02B 6/4459; G02B 6/4466; G02B 6/4467; G02B 6/504; H02G 3/083
See application file for complete search history.

(56) References Cited

U.S. PATENT DOCUMENTS

| | | | |
|---|---|---|---|
| 4,329,083 A | 5/1982 | Parkinson | |
| 4,620,317 A | 10/1986 | Anderson | |
| 4,815,814 A | 3/1989 | Ulijasz | |
| 4,940,359 A | 7/1990 | Van Duyn et al. | |
| 5,239,129 A | 8/1993 | Ehrenfels | |
| 5,313,546 A | 5/1994 | Toffetti | |
| 5,528,684 A | 6/1996 | Schneider et al. | |
| 5,566,622 A | 10/1996 | Ziaylek, Jr. et al. | |
| 5,583,492 A | 12/1996 | Nakanishi | |
| 5,606,606 A | 2/1997 | Schneider et al. | |
| 5,717,955 A | 2/1998 | Swinehart | |
| 5,760,706 A | 6/1998 | Kiss | |
| 5,879,109 A | 3/1999 | Diermeier et al. | |
| 6,099,080 A | 8/2000 | Hirashita et al. | |
| 6,125,291 A | 9/2000 | Miesel | |
| 6,272,346 B1 | 8/2001 | Fujinami | |
| 6,371,691 B1 | 4/2002 | Finzel et al. | |
| 6,414,605 B1 | 7/2002 | Walden | |
| 6,499,410 B1 | 12/2002 | Berardi | |
| 6,503,025 B1 | 1/2003 | Miller | |
| 6,792,319 B1 | 9/2004 | Bilger | |
| 6,807,355 B2 | 10/2004 | Dofher | |
| 6,829,424 B1 | 12/2004 | Finzel et al. | |
| 6,866,448 B2 | 3/2005 | Finzel et al. | |
| 6,990,192 B1 | 1/2006 | Denovich et al. | |
| 7,030,781 B2 | 4/2006 | Jones | |
| 7,050,683 B2 | 5/2006 | Dofher | |
| 7,095,930 B2 | 8/2006 | Storaasli et al. | |
| 7,096,003 B2 | 8/2006 | Joao | |
| 7,397,363 B2 | 7/2008 | Joao | |
| 7,514,628 B2 | 4/2009 | Kadrnoska et al. | |
| 7,522,805 B2 | 4/2009 | Smith et al. | |
| 7,674,980 B2 | 3/2010 | Lubanski | |
| 7,739,030 B2 | 6/2010 | Desai | |
| 7,740,417 B2 | 6/2010 | Jang | |
| 7,849,886 B2 | 12/2010 | Carew et al. | |
| 7,936,264 B2* | 5/2011 | Kates ..................... | H04Q 9/02 340/539.22 |
| D640,290 S | 6/2011 | Stellman et al. | |
| 8,000,314 B2 | 8/2011 | Brownrigg | |
| 8,061,344 B2 | 11/2011 | Dofher | |
| 8,296,383 B2 | 10/2012 | Lindahl | |
| 8,344,953 B1 | 1/2013 | Gilbrech | |
| 8,380,652 B1 | 2/2013 | Francis, Jr. | |
| 8,480,332 B2 | 7/2013 | Miller et al. | |
| 8,654,936 B1 | 2/2014 | Eslambolchi et al. | |
| 8,787,246 B2 | 7/2014 | Brownrigg | |
| 8,811,887 B2 | 8/2014 | Dottling et al. | |
| 8,976,704 B2 | 3/2015 | Morper | |
| 9,062,423 B2 | 6/2015 | Allouche et al. | |
| 9,210,583 B2 | 12/2015 | Henderson | |
| 9,226,418 B2 | 12/2015 | Magno et al. | |
| 9,270,098 B2 | 2/2016 | Isaaks et al. | |
| 9,298,410 B2 | 3/2016 | Juchem | |
| 9,326,297 B1 | 4/2016 | Farkas | |
| 9,432,340 B1 | 8/2016 | Tutt et al. | |
| 9,456,276 B1 | 9/2016 | Chhetri | |
| 9,466,966 B2 | 10/2016 | Allouche et al. | |
| 9,531,174 B2 | 12/2016 | Elford et al. | |
| 9,536,425 B1 | 1/2017 | Soltesz | |
| 9,588,315 B1 | 3/2017 | Turner | |
| 9,742,172 B2 | 8/2017 | Elford et al. | |
| 9,780,433 B2 | 10/2017 | Schwengler et al. | |
| 9,786,997 B2 | 10/2017 | Schwengler et al. | |
| 9,832,655 B2 | 11/2017 | Horneman | |
| 9,860,677 B1 | 1/2018 | Agerstam | |
| 9,860,812 B1 | 1/2018 | Tipton | |
| 9,867,057 B2 | 1/2018 | Yu | |
| 9,867,112 B1 | 1/2018 | Schwengler | |
| 9,917,903 B2 | 3/2018 | Clernon | |
| 10,045,150 B2* | 8/2018 | Zakaria ............ | H04M 1/72533 |
| 10,069,751 B2 | 9/2018 | Amulothu | |
| 10,276,921 B2* | 4/2019 | Vermes ................ | G02B 6/4451 |
| 10,700,411 B2* | 6/2020 | Vermes ................ | G02B 6/4459 |
| 2001/0029311 A1 | 10/2001 | Khare | |
| 2002/0024450 A1 | 2/2002 | Townsend | |
| 2002/0057945 A1 | 5/2002 | Dahowski | |
| 2002/0061231 A1 | 5/2002 | Finzel et al. | |
| 2003/0061029 A1 | 3/2003 | Shaket | |
| 2003/0121686 A1 | 7/2003 | Barabash | |
| 2003/0123935 A1 | 7/2003 | Dofher | |
| 2003/0210958 A1 | 11/2003 | Nothofer | |
| 2004/0083054 A1 | 4/2004 | Jones | |
| 2004/0091313 A1 | 5/2004 | Zhou | |
| 2004/0113773 A1 | 6/2004 | Nieters | |
| 2004/0115004 A1 | 6/2004 | Serrano | |
| 2004/0129445 A1 | 7/2004 | Winkelbach | |
| 2004/0142658 A1 | 7/2004 | McKenna | |
| 2004/0160319 A1 | 8/2004 | Joao | |
| 2004/0221324 A1 | 11/2004 | Ansari et al. | |
| 2004/0234215 A1 | 11/2004 | Serrano et al. | |
| 2005/0013566 A1 | 1/2005 | Storaasli | |
| 2005/0191113 A1 | 9/2005 | Frazier | |
| 2005/0191133 A1 | 9/2005 | Purcell | |
| 2005/0207711 A1 | 9/2005 | Vo | |
| 2005/0248444 A1 | 11/2005 | Joao | |
| 2005/0259930 A1 | 11/2005 | Elkins et al. | |
| 2005/0285807 A1 | 12/2005 | Zehngut | |

(56) References Cited

U.S. PATENT DOCUMENTS

| | | |
|---|---|---|
| 2006/0008231 A1 | 1/2006 | Reagan |
| 2006/0093303 A1 | 5/2006 | Reagan et al. |
| 2006/0118338 A1 | 6/2006 | Maybury |
| 2006/0204187 A1 | 9/2006 | Dofher |
| 2007/0018849 A1 | 1/2007 | Salser, Jr. |
| 2007/0048084 A1 | 3/2007 | Jung |
| 2007/0079113 A1 | 4/2007 | Kulkarni et al. |
| 2007/0087756 A1 | 4/2007 | Hoffberg |
| 2007/0154152 A1 | 7/2007 | Morris |
| 2007/0247794 A1 | 10/2007 | Jaffe |
| 2008/0216367 A1 | 9/2008 | Van der Poel |
| 2008/0234878 A1 | 9/2008 | Joao |
| 2008/0256008 A1 | 10/2008 | Kwok |
| 2008/0298755 A1 | 12/2008 | Caplan |
| 2008/0303654 A1 | 12/2008 | Kates |
| 2009/0121860 A1 | 5/2009 | Kimmel |
| 2009/0125160 A1 | 5/2009 | Desai |
| 2009/0177172 A1 | 7/2009 | Wilkes |
| 2009/0214163 A1 | 8/2009 | Lu |
| 2009/0317047 A1 | 12/2009 | Smith |
| 2009/0327910 A1 | 12/2009 | Black |
| 2010/0010117 A1 | 1/2010 | Bricout |
| 2010/0045484 A1 | 2/2010 | Brynielsson |
| 2010/0047021 A1 | 2/2010 | Scola |
| 2010/0071596 A1 | 3/2010 | Konczak |
| 2010/0086254 A1 | 4/2010 | Dofher |
| 2010/0124332 A1 | 5/2010 | Arena |
| 2010/0217604 A1 | 8/2010 | Baldwin et al. |
| 2010/0243096 A1 | 9/2010 | Berglund |
| 2010/0325421 A1 | 12/2010 | Park et al. |
| 2011/0016754 A1 | 1/2011 | Ruhl et al. |
| 2011/0052131 A1 | 3/2011 | Park et al. |
| 2011/0106321 A1 | 5/2011 | Cherian |
| 2011/0161076 A1 | 6/2011 | Davis |
| 2011/0288684 A1 | 11/2011 | Farlow |
| 2011/0315259 A1 | 12/2011 | Kelly |
| 2012/0048148 A1 | 3/2012 | Konczak |
| 2012/0086563 A1 | 4/2012 | Arling |
| 2012/0195694 A1 | 8/2012 | Konczak |
| 2012/0249341 A1 | 10/2012 | Brown |
| 2012/0265370 A1 | 10/2012 | Kim |
| 2012/0268886 A1 | 10/2012 | Leontiev |
| 2012/0320766 A1 | 12/2012 | Sridhar |
| 2013/0009569 A1 | 1/2013 | Knibbe |
| 2013/0011198 A1 | 1/2013 | Pichler |
| 2013/0044918 A1 | 2/2013 | Nielsen et al. |
| 2013/0074067 A1 | 3/2013 | Chowdhry |
| 2013/0080898 A1 | 3/2013 | Lavian |
| 2013/0121761 A1 | 5/2013 | Dixon |
| 2013/0138424 A1 | 5/2013 | Koenig |
| 2013/0216187 A1 | 8/2013 | Dowling |
| 2013/0216313 A1 | 8/2013 | Gustavsson et al. |
| 2013/0217421 A1 | 8/2013 | Kim |
| 2013/0223807 A1 | 8/2013 | Elford et al. |
| 2013/0238326 A1 | 9/2013 | Kim et al. |
| 2013/0287500 A1 | 10/2013 | Miller |
| 2013/0294839 A1 | 11/2013 | Gustavsson et al. |
| 2013/0297199 A1 | 11/2013 | Kapp |
| 2014/0018969 A1 | 1/2014 | Forbes |
| 2014/0033288 A1 | 1/2014 | Wynn |
| 2014/0146905 A1 | 5/2014 | Zavadsky |
| 2014/0148093 A1 | 5/2014 | Nguyen |
| 2014/0162629 A1 | 6/2014 | Tipton |
| 2014/0167931 A1 | 6/2014 | Lee et al. |
| 2014/0180478 A1 | 6/2014 | Letsky |
| 2014/0188463 A1 | 7/2014 | Noh et al. |
| 2014/0202571 A1 | 7/2014 | Spijker |
| 2014/0233412 A1 | 8/2014 | Mishra |
| 2014/0270971 A1 | 9/2014 | Allouche et al. |
| 2014/0275852 A1 | 9/2014 | Hong |
| 2014/0327583 A1 | 11/2014 | Sparks |
| 2014/0343950 A1 | 11/2014 | Simpson et al. |
| 2014/0369336 A1 | 12/2014 | Prakash |
| 2015/0035704 A1 | 2/2015 | Schwengler et al. |
| 2015/0070221 A1 | 3/2015 | Schwengler et al. |
| 2015/0092744 A1 | 4/2015 | Singh |
| 2015/0098385 A1 | 4/2015 | Navalekar |
| 2015/0110453 A1 | 4/2015 | Elford et al. |
| 2015/0111589 A1 | 4/2015 | Yavuz |
| 2015/0120502 A1 | 4/2015 | Jung et al. |
| 2015/0124622 A1 | 5/2015 | Kovvali |
| 2015/0139598 A1 | 5/2015 | Barnes et al. |
| 2015/0230008 A1 | 8/2015 | Elford et al. |
| 2015/0249672 A1 | 9/2015 | Burns et al. |
| 2015/0262102 A1 | 9/2015 | Tann |
| 2015/0288161 A1 | 10/2015 | Allouche et al. |
| 2015/0298654 A1 | 10/2015 | Joao |
| 2015/0300527 A1 | 10/2015 | Konczak |
| 2015/0350247 A1 | 12/2015 | Adler et al. |
| 2015/0365278 A1 | 12/2015 | Chakrabarti et al. |
| 2016/0006837 A1 | 1/2016 | Reynolds |
| 2016/0021127 A1 | 1/2016 | Yan |
| 2016/0029346 A1 | 1/2016 | Suresh et al. |
| 2016/0063857 A1 | 3/2016 | Fowe |
| 2016/0064829 A1 | 3/2016 | Schaepperle |
| 2016/0080322 A1 | 3/2016 | Prisser |
| 2016/0085594 A1 | 3/2016 | Wang |
| 2016/0109036 A1 | 4/2016 | Elford et al. |
| 2016/0109678 A1 | 4/2016 | Schwengler et al. |
| 2016/0112779 A1 | 4/2016 | Barnett et al. |
| 2016/0187995 A1 | 6/2016 | Rosewall |
| 2016/0195876 A1 | 7/2016 | Mattsson |
| 2016/0212012 A1 | 7/2016 | Young |
| 2016/0212613 A1 | 7/2016 | Huang |
| 2016/0226231 A1 | 8/2016 | Elford et al. |
| 2016/0226674 A1 | 8/2016 | Kangshang et al. |
| 2016/0248746 A1 | 8/2016 | James |
| 2016/0277310 A1 | 9/2016 | Challa |
| 2016/0278599 A1 | 9/2016 | Seo |
| 2016/0294828 A1 | 10/2016 | Zakaria |
| 2016/0295364 A1 | 10/2016 | Zakaria |
| 2016/0323271 A1 | 11/2016 | Hinman |
| 2016/0329040 A1 | 11/2016 | Whinnery |
| 2016/0330042 A1 | 11/2016 | Andersen |
| 2016/0352526 A1 | 12/2016 | Adler et al. |
| 2016/0359965 A1 | 12/2016 | Murphy et al. |
| 2016/0365163 A1 | 12/2016 | Singh |
| 2017/0006141 A1 | 1/2017 | Bhadra |
| 2017/0006643 A1 | 1/2017 | Zakaria et al. |
| 2017/0026157 A1 | 1/2017 | Bugenhagen et al. |
| 2017/0026472 A1 | 1/2017 | Bugenhagen et al. |
| 2017/0026607 A1 | 1/2017 | Kim |
| 2017/0059802 A1 | 3/2017 | Elford et al. |
| 2017/0060369 A1 | 3/2017 | Goyal |
| 2017/0085437 A1 | 3/2017 | Condeixa et al. |
| 2017/0093866 A1 | 3/2017 | Ben-Noon |
| 2017/0110784 A1 | 4/2017 | Vermes et al. |
| 2017/0118687 A1 | 4/2017 | Tipton |
| 2017/0134937 A1 | 5/2017 | Miller |
| 2017/0141575 A1 | 5/2017 | Fulton |
| 2017/0150299 A1 | 5/2017 | Coutinho et al. |
| 2017/0171747 A1 | 6/2017 | Britt et al. |
| 2017/0176034 A1 | 6/2017 | Hussain |
| 2017/0181383 A1 | 6/2017 | Shen |
| 2017/0187807 A1 | 6/2017 | Clernon |
| 2017/0192437 A1 | 7/2017 | Bier |
| 2017/0195318 A1 | 7/2017 | Liu |
| 2017/0195891 A1 | 7/2017 | Smith et al. |
| 2017/0201504 A1 | 7/2017 | Funk |
| 2017/0206900 A1 | 7/2017 | Lee et al. |
| 2017/0229004 A1 | 8/2017 | Shah |
| 2017/0237815 A1 | 8/2017 | Arsenault |
| 2017/0253258 A1 | 9/2017 | Bramucci |
| 2017/0279620 A1 | 9/2017 | Kravitz et al. |
| 2017/0300953 A1 | 10/2017 | Kim |
| 2017/0317482 A1 | 11/2017 | Elford et al. |
| 2017/0345295 A1 | 11/2017 | Mattar |
| 2017/0345420 A1 | 11/2017 | Barnett, Jr. |
| 2017/0358025 A1 | 12/2017 | Varma |
| 2017/0358837 A1 | 12/2017 | Schwengler et al. |
| 2017/0358869 A1 | 12/2017 | Schwengler et al. |
| 2018/0040172 A1 | 2/2018 | Funk |
| 2018/0062691 A1 | 3/2018 | Barnett, Jr. |
| 2018/0084596 A1 | 3/2018 | Schwengler et al. |

(56) References Cited

U.S. PATENT DOCUMENTS

| | | |
|---|---|---|
| 2018/0103579 A1 | 4/2018 | Grufman |
| 2018/0113450 A1 | 4/2018 | Sherony |
| 2018/0122506 A1 | 5/2018 | Grantcharov |
| 2018/0132227 A1 | 5/2018 | Ghosh |
| 2018/0136424 A1 | 5/2018 | Elford |
| 2018/0146412 A1 | 5/2018 | Schwengler |
| 2018/0168464 A1 | 6/2018 | Barnett, Jr. et al. |
| 2018/0178781 A1 | 6/2018 | Funk et al. |
| 2018/0181091 A1 | 6/2018 | Funk et al. |
| 2018/0181094 A1 | 6/2018 | Funk et al. |
| 2018/0181095 A1 | 6/2018 | Funk et al. |
| 2018/0183685 A1 | 6/2018 | Cook |
| 2018/0183874 A1 | 6/2018 | Cook |
| 2018/0188704 A1 | 7/2018 | Cella |
| 2018/0196216 A1 | 7/2018 | Elford et al. |
| 2018/0295405 A1 | 10/2018 | Barnett, Jr. et al. |
| 2019/0028134 A1 | 1/2019 | Barnett, Jr. |
| 2019/0028951 A1 | 1/2019 | Schwengler et al. |
| 2019/0106099 A1 | 4/2019 | Funk et al. |
| 2019/0107683 A1 | 4/2019 | Elford et al. |
| 2019/0252763 A1 | 8/2019 | Vermes et al. |

FOREIGN PATENT DOCUMENTS

| | | |
|---|---|---|
| FR | 2750717 | 1/1998 |
| GB | 2327680 | 2/1999 |
| JP | H03139705 | 6/1991 |
| KR | 10-2015-0128346 | 11/2015 |
| WO | WO 2010140507 | 5/1998 |
| WO | WO 199961710 | 12/1999 |
| WO | WO 200229947 | 4/2002 |
| WO | WO 2009098676 | 8/2009 |
| WO | WO 2013058648 | 4/2013 |
| WO | WO 2013130644 | 9/2013 |
| WO | WO 2014151726 | 9/2014 |
| WO | WO 2017123392 | 7/2017 |

OTHER PUBLICATIONS

European Patent Application No. 14768062.3; Extended European Search Report dated Oct. 18, 2016; 5 pages.
International Preliminary Report on Patentability, dated Jul. 17, 2018, Int'l Appl. No. PCT/US16/067938, Int'l Filing Date Dec. 21, 2016, 8 pgs.
International Preliminary Report on Patentability, dated Nov. 27, 2018, Int'l Appl. No. PCT/US17/034531, Int'l Filing Date May 25, 2017; 15 pgs.
International Search Report and Written Opinion prepared by the Korean Intellectual Property Office as International Searching Authority for PCT Intl Patent App. No. PCT/US2016/067938 dated Mar. 31, 2017; 11 pages.
International Search Report and Written Opinion prepared by the Korean Intellectual Property Office as Internationalo Searching Authority for PCT International Patent Application No. PCT/US2017/034531 dated Aug. 29, 2017; 18 p.
International Search Report and Written Opinion prepared by the U.S. Patent and Trademark Office as International Search Authority in PCT International Patent Application No. PCT/US2014/026325, dated Aug. 8, 2014; 12 pages.
International Search Report and Written Opinion prepared by the U.S. Patent and Trademark Office as International Searching Authority for PCT International Patent Application No. PCT/US2013/0280 dated May 3, 2013; 20 pages.
Lejun Qi, Linnea Petersson & Tieliang Liu (2014) Review of Recent Activities on Dielectric Films for Capacitor Applications, Journal of International Council on Electrical Engineering, 4:1, 1-6, DOI: 10.5370/JICEE.2014.4.1.001.
PCT International Patent Application No. PCT/US2014/026325, International Preliminary Report on Patentability dated Sep. 15, 2015; 8 pages.
Preliminary Report on Patentability for PCT International Patent Application No. PCT/US2013/0280 dated Sep. 12, 2014; 13 pages.
Alexander, Chris et al., "Improved User Authentication in Off-The-Record Messaging", 2009, 7 pgs.
Bersch, Christian et al., "Bimanual Robotic Cloth Manipulation for Laundry Folding", 2011, 7 pgs.
Borisov, Nikita et al., "Off-the-Record Communication, or, Why Not to Use PGP", 2004, 8 pgs.
De Raimondo, Mario et al., "Secure Off-the-Record Messaging", 2005, 9 pgs.
Goldberg, Ian et al., "Multi-party Off-the-Record Messaging", 2007, 11 pgs.
Stedman, Ryan et al., "A User Study of Off-the-Record Messaging", 2008, pp. 1-10.

* cited by examiner

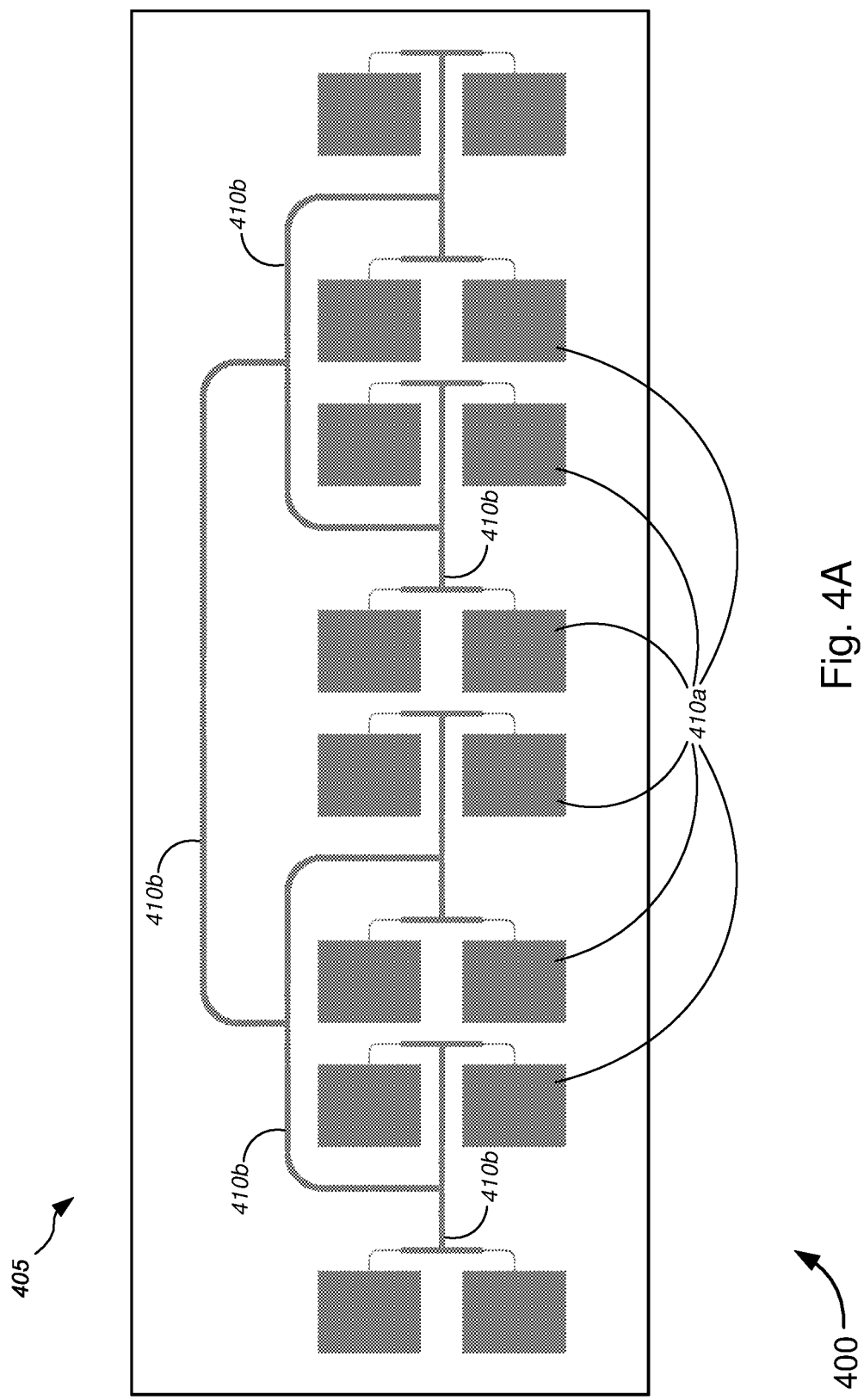

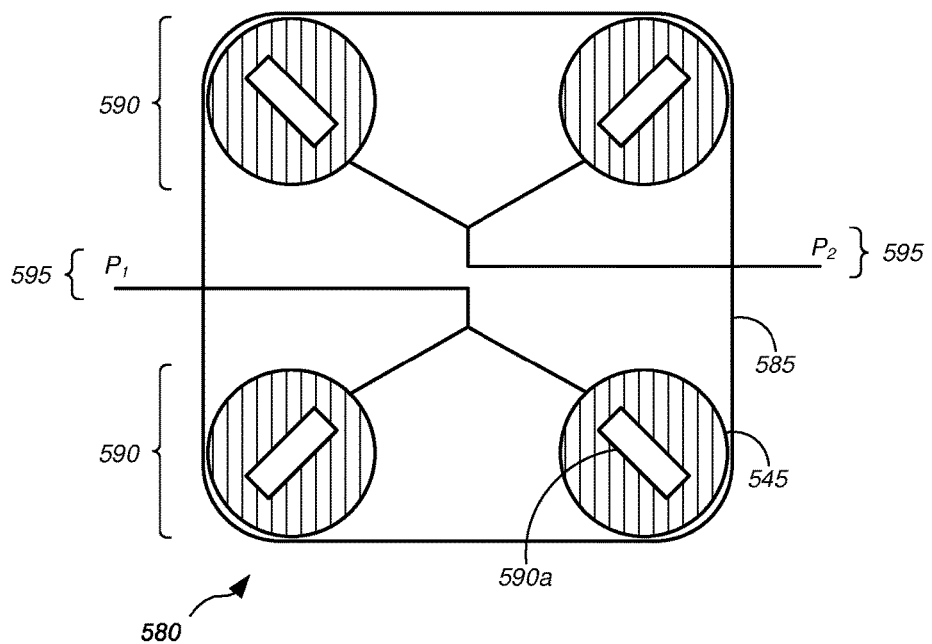
Fig. 5I
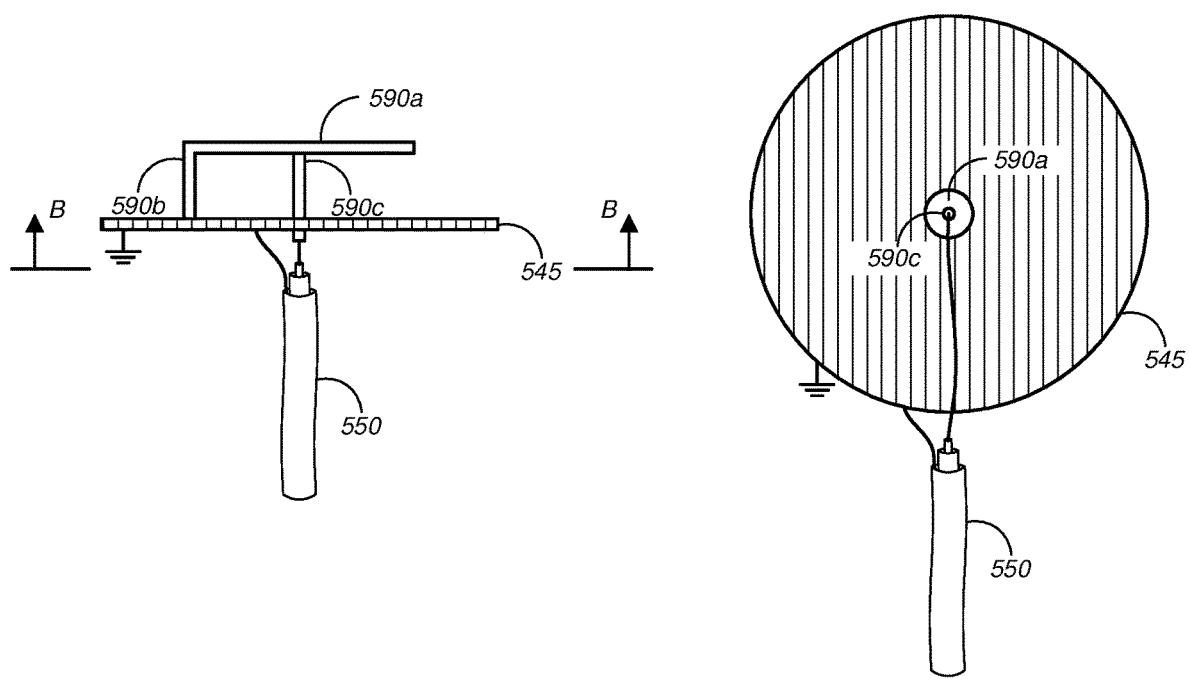
Fig. 5J
Fig. 5K

RADIATING CLOSURES

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing telecommunications signal relays, and, more particularly, to methods, systems, and apparatuses for implementing telecommunications signal relays using radiating closures that are at least one of aerial radiating closures, below grade radiating closures, and/or buried radiating closures.

BACKGROUND

Although aerial closures, below grade closures, and buried closures are currently available, such conventional closures do not appear to enable wireless transmission from antennas disposed within them or embedded within their housings or shells. These conventional closures also do not appear to utilize low spectrum signals and/or or higher gain through multiple antennas, nor do they appear to utilize IoT sensors disposed within them.

Hence, there is a need for more robust and scalable solutions for implementing telecommunications signal relays, and, more particularly, to methods, systems, and apparatuses for implementing telecommunications signal relays using radiating closures that are at least one of aerial radiating closures, below grade radiating closures, and/or buried radiating closures, and/or the like.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 4A-4D are general schematic diagrams illustrating various embodiments of two- and three-dimensional antenna arrays, systems, or designs that may be used in the radiating closure for implementing telecommunications signal relays.

FIGS. 5A-5K are general schematic diagrams illustrating various antennas or antenna designs that may be used in the radiating closure for implementing telecommunications signal relays, in accordance with various embodiments.

DETAILED DESCRIPTION OF CERTAIN EMBODIMENTS

Overview

Figure 1:
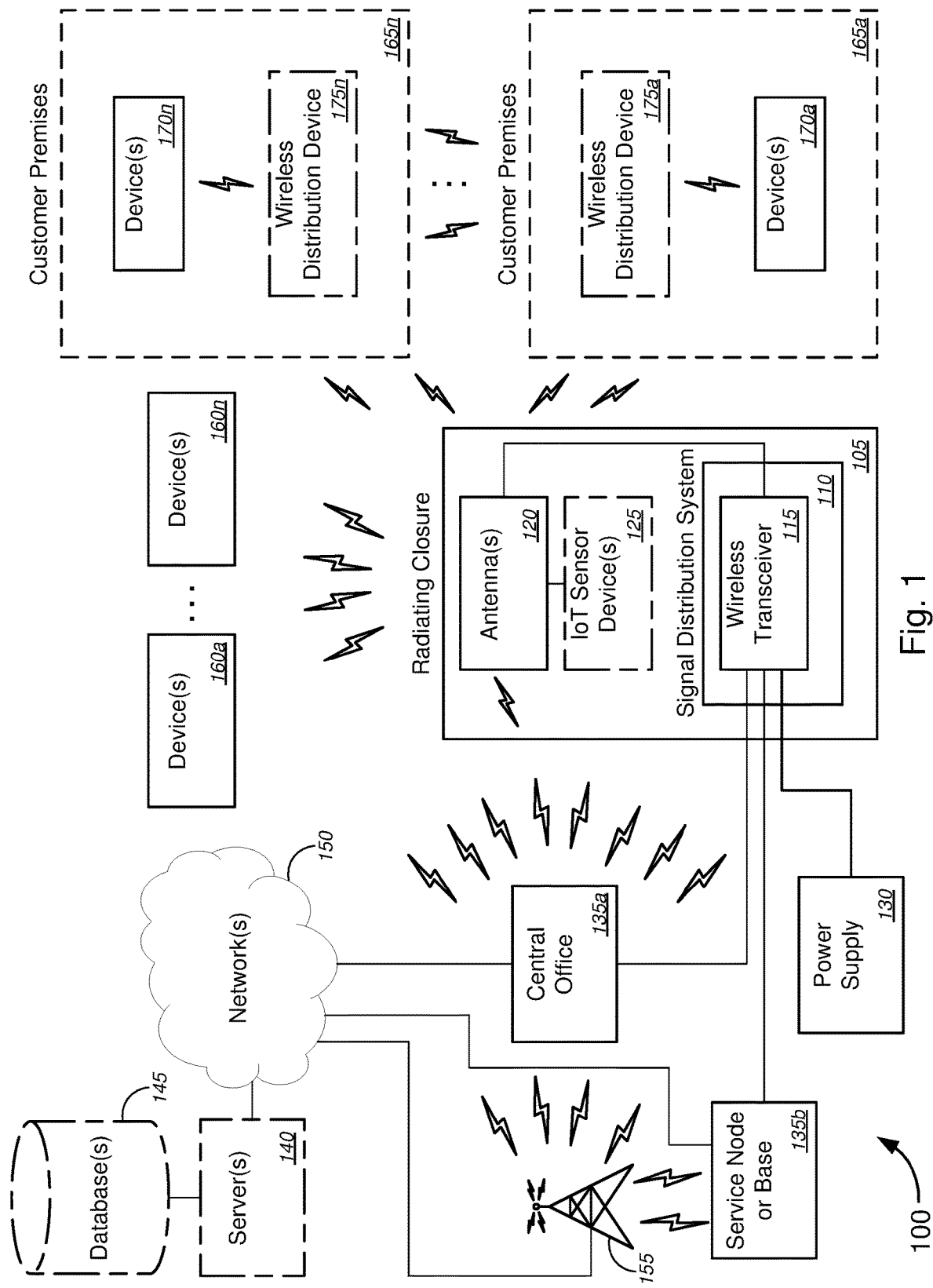
FIG. 1 is a schematic diagram illustrating a system for implementing distributed broadband wireless implementation in premises electrical devices, in accordance with various embodiments.

Various embodiments provide tools and techniques for implementing telecommunications signal relays, and, more particularly, to methods, systems, and apparatuses for implementing telecommunications signal relays using radiating closures that are at least one of aerial radiating closures, below grade radiating closures, and/or buried radiating closures, and/or the like.

In various embodiments, a signal distribution system, which might be disposed within a radiating closure, might receive a first communications signal. A wireless transceiver of the signal distribution system might send the first communications signal, via one or more wireless communications channels, to one or more devices that are external to the radiating closure. In some embodiments, antennas—which might comprise first antennas disposed within the radiating closure or second antennas embedded in a housing material of the radiating closure, or both—might direct the first communications signal that is sent, via the one or more wireless communications channels, from the wireless transceiver to the one or more devices, in some cases, directing the first communications signal in multiple different directions (either two or more discretely different directions or in all directions (i.e., radiating radially outward in three-dimensions, similar, but not limited, to radiating from a sphere or radiating from some other three-dimensional object, or the like)). In some cases, IoT sensors may be implemented in the radiating closure.

According to some embodiments, a physical closure is provided that combines a number of unique advantages. The closure can be aerial, direct buried, or below ground. The closure material might contain embedded material that make an antenna designed to radiate in all or a given direction around the closure. The wireless communication system uses signal lines that are conveniently available in the closure (e.g., fiber, copper, coax, etc.) and optionally line powering. Three main purposes may be achieved using the embodiments described herein. The main goal is to provide wireless access—mobile or fixed—cellular or broadband to a certain area (similar to that as described in detail in the '665 Application (which has already been incorporated herein by reference in its entirety for all purposes), which covered a number of buildings and structures including pedestals, cabinets, but not closures). The closure is an ideal location to place the wireless distribution system because it can be placed aerially in any design, direct buried, or placed below ground up to the customer property (such as the front yard or the like). The second purpose is to use the closure material and structural role as an antenna support. These closures are usually made of plastic or aluminum (or other metal), and combining that shell material with various antenna designs such as microstrip patches is a cost efficient manufacturing approach. The third purpose is that the closure may additionally contain sensors or other Internet of Things ("IoT") devices—it is, for instance, important to monitor temperature, humidity, chemical levels in some closures, pressure, and/or the like in direct buried or below ground closures (and also in aerial closures) to be able to detect an abnormal pressure/crushing event or other external conditions (e.g., weather or the like), that may damage cables or communications devices.

Merely by way of example, in some embodiments, antenna structures might be implemented to optimize transmission and reception of wireless signals from ground-based signal distribution devices, which include, but are not limited to, FDH, hand holes, and/or NAPs. In some cases, antenna structures might also be implemented within devices (e.g., wireless access point devices) that are imbedded or located within apical conduit channels, as described in detail in the '574 Application. In some embodiments, an antenna might be provided within a signal distribution device, which might include a container disposed in a ground surface. A top portion of the container might be substantially level with a top portion of the ground surface. The antenna might be communicatively coupled to one or more of at least one conduit, at least one optical fiber line, at least one conductive signal line, or at least one power line via the container and via an apical conduit system(s) installed in a roadway. In the embodiments described with respect to the figures below, antenna structures might be implemented to optimize transmission and reception of wireless signals in below grade implementations (including, but not limited to, a closure or container that is disposed in a man hole or hand hole, mostly surrounded by air and other closures, or the like), or in aerial implementations (including, without limitation, an aerial closure or container—including, but not limited to the SLIC™ line of aerial closures by 3M™, or any suitable container that can be suspended in the air (e.g., by wires, cables, support lines, utility poles, and/or the like)). Wireless applications with such devices and systems might include, without limitation, wireless signal transmission and reception in accordance with IEEE 802.11a/b/g/n/ac/ad/af standards, UMTS, CDMA, LTE, PCS, AWS, EAS, BRS, and/or the like.

According to some embodiments, the methods, apparatuses, and systems might be applied to 2.4 GHz and 5 GHz wireless broadband signal distribution as used with today's IEEE 802.11a/b/g/n/ac lines of products. Given the low profile devices, such methods, apparatuses, and systems may also be applicable to upcoming TV white spaces applications (and the corresponding IEEE 802.11af standard). In addition, small cells at 600 MHz and 700 MHz may be well-suited for use with these devices. In some embodiments, higher frequencies can be used such as 60 GHz and the corresponding standard IEEE 802.11ad. The '574, '216, and '665 Applications, which have been incorporated herein by reference in their entirety, describe in further detail embodiments utilizing wireless access points based on IEEE 802.11ad and a system of ground-based signal distribution devices having these 60 GHz wireless access points disposed therein that are in line of sight of the customer premises. Methods for placing, powering, and backhauling radio access units using a combination of existing copper lines, cabinets, pedestals, hand holes, new power lines, new optical fiber connections to the customer premises, placement of radio equipment in pedestals or hand holes, and/or the like, via use of apical conduit systems are described in detail in the '034, '574, '691, '676, '216, and '665 Applications, which are already incorporated herein by reference in their entirety.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, a method might comprise receiving, with a signal distribution system disposed within a radiating closure, a first communications signal and sending, with a wireless transceiver of the signal distribution system, the first communications signal, via one or more wireless communications channels, to one or more devices that are external to the radiating closure. The method might further comprise directing, with at least one of one or more first antennas disposed within the radiating closure or one or more second antennas embedded in a housing material of the radiating closure, the first communications signal that is sent, via the one or more wireless communications channels, from the wireless transceiver to the one or more devices.

In some embodiments, the radiating closure might be one of an aerial radiating closure, a below grade radiating closure, or a buried radiating closure, and/or the like. In some cases, receiving the first communications signal might comprise receiving, with the signal distribution system, the first communications signal via one or more signal lines entering the radiating closure through one or more pass-throughs in at least one wall of the radiating closure. The one or more signal lines might comprise at least one of one or more telecommunications lines, one or more broadband-over-power signal lines, one or more copper cable lines, one or more optical fiber lines, or one or more coaxial cable lines, and/or the like.

According to some embodiments, directing the first communications signal to the one or more devices via the one or more wireless communications channels might comprise directing, with the at least one of the one or more first antennas disposed within the radiating closure or the one or more second antennas embedded in the housing material of the radiating closure, the first communications signal to the one or more devices via the one or more wireless communications channels in multiple different directions.

Merely by way of example, in some instances, the one or more first antennas and the one or more second antennas might each transmit and receive wireless broadband signals according to a set of protocols comprising at least one of IEEE 802.11a, IEEE 802.11b, IEEE 802.11g, IEEE 802.11n, IEEE 802.11ac, IEEE 802.11ad, or IEEE 802.11af, and/or the like. In some cases, the one or more first antennas and the one or more second antennas might each transmit and receive wireless broadband signals according to a set of protocols comprising at least one of Universal Mobile Telecommunications System ("UMTS"), Code Division Multiple Access ("CDMA"), Time Division Multiple Access ("TDMA"), Global System for Mobile Communication ("GSM"), Long Term Evolution ("LTE"), Personal Communications Service ("PCS"), Advanced Wireless Services ("AWS"), Emergency Alert System ("EAS"), Citizens Band Radio Service ("CBRS"), or Broadband Radio Service ("BRS"), and/or the like. According to some embodiments, the one or more first antennas might each comprise at least one of a plurality of lateral patch antennas, a plurality of arrays of patch antennas, one or more micro-strip patch antennas, a two-dimensional ("2D") leaky waveguide antenna, or a three-dimensional ("3D") array of antenna elements, and/or the like. One or more of the at least one of the plurality of lateral patch antennas, the plurality of arrays of patch antennas, the one or more micro-strip patch antennas, the two-dimensional ("2D") leaky waveguide antenna, or the three-dimensional ("3D") array of antenna elements, and/or the like might comprise flexible material that allows the one or more of the at least one of the plurality of lateral patch antennas, the plurality of arrays of patch antennas, the one or more micro-strip patch antennas, the two-dimensional ("2D") leaky waveguide antenna, or the three-dimensional ("3D") array of antenna elements, and/or the like to be bent while being disposed within the radiating closure. In some cases, at least one of the one or more first antennas and the one or more second antennas might comprise at least one active antenna element.

In some embodiments, the method might further comprise monitoring, with one or more Internet of Things ("IoT")-capable sensor devices disposed within the radiating closure, one or more environmental conditions within the radiating closure and external to the radiating closure; determining, with the one or more IoT-capable sensor devices, whether one or more sensor data corresponding to the monitored one or more environmental conditions exceed one or more corresponding predetermined thresholds; and, based on a determination that the one or more sensor data corresponding to the monitored one or more environmental conditions exceed one or more corresponding predetermined thresholds, autonomously sending, with the one or more IoT-capable sensor devices and via machine-to-machine communications, the one or more sensor data to one or more nodes. In some cases, the one or more IoT-capable sensor devices might comprise at least one of one or more temperature sensors, one or more humidity sensors, one or more accelerometers, one or more vibration sensors, one or more chemical detectors, one or more pressure sensors, one or more weather sensors, one or more wind sensors, one or more moisture sensors, or one or more seismic sensors, and/or the like.

In another aspect, an apparatus might comprise a housing; a signal distribution system, which is disposed within the housing, that receives a first communications signal; a wireless transceiver, which is communicatively coupled to the signal distribution system, that sends the first communications signal, via one or more wireless communications channels, to one or more devices that are external to the housing; and at least one of one or more first antennas disposed within the housing or one or more second antennas embedded in a housing material of the housing that directs the first communications signal that is sent, via the one or more wireless communications channels, from the wireless transceiver to the one or more devices.

In some embodiments, the apparatus might be a radiating closure that forms a container. Alternatively, or additionally, the apparatus might be a radiating closure that forms a lid of a container. In some instances, the housing material might comprise at least one of metal or plastic, and/or the like. According to some embodiments, the apparatus might be a radiating closure, which might be one of an aerial radiating closure, a below grade radiating closure, or a buried radiating closure, and/or the like.

In some cases, receiving the first communications signal might comprise receiving the first communications signal via one or more signal lines entering the apparatus through one or more pass-throughs in at least one wall of the housing, the one or more signal lines comprising at least one of one or more telecommunications lines, one or more broadband-over-power signal lines, one or more copper cable lines, one or more optical fiber lines, or one or more coaxial cable lines, and/or the like. According to some embodiments, directing the first communications signal to the one or more devices via the one or more wireless communications channels comprises directing the first communications signal to the one or more devices via the one or more wireless communications channels in multiple different directions.

Merely by way of example, in some instances, the one or more first antennas and the one or more second antennas might each transmit and receive wireless broadband signals according to a set of protocols comprising at least one of IEEE 802.11a, IEEE 802.11b, IEEE 802.11g, IEEE 802.11n, IEEE 802.11ac, IEEE 802.11ad, or IEEE 802.11af, and/or the like. In some cases, the one or more first antennas and the one or more second antennas might each transmit and receive wireless broadband signals according to a set of protocols comprising at least one of Universal Mobile Telecommunications System ("UMTS"), Code Division Multiple Access ("CDMA"), Time Division Multiple Access ("TDMA"), Global System for Mobile Communication ("GSM"), Long Term Evolution ("LTE"), Personal Communications Service ("PCS"), Advanced Wireless Services ("AWS"), Emergency Alert System ("EAS"), Citizens Band Radio Service ("CBRS"), or Broadband Radio Service ("BRS"), and/or the like. According to some embodiments, the one or more first antennas might each comprise at least one of a plurality of lateral patch antennas, a plurality of arrays of patch antennas, one or more micro-strip patch antennas, a two-dimensional ("2D") leaky waveguide antenna, or a three-dimensional ("3D") array of antenna elements, and/or the like. One or more of the at least one of the plurality of lateral patch antennas, the plurality of arrays of patch antennas, the one or more micro-strip patch antennas, the two-dimensional ("2D") leaky waveguide antenna, or the three-dimensional ("3D") array of antenna elements, and/or the like might comprise flexible material that allows the one or more of the at least one of the plurality of lateral patch antennas, the plurality of arrays of patch antennas, the one or more micro-strip patch antennas, the two-dimensional ("2D") leaky waveguide antenna, or the three-dimensional ("3D") array of antenna elements, and/or the like to be bent while being disposed within the housing. In some cases, at least one of the one or more first antennas and the one or more second antennas might comprise at least one active antenna element.

In some embodiments, the apparatus might further comprise one or more Internet of Things ("IoT")-capable sensor devices disposed within the housing. The one or more IoT-capable sensor devices might each comprise one or more first sensors; one or more first transceivers; at least one first processor; and a first non-transitory computer readable medium communicatively coupled to the at least one first processor. The first non-transitory computer readable medium might have stored thereon computer software comprising a first set of instructions that, when executed by the at least one first processor, causes the IoT-capable sensor device to: monitor, using the one or more first sensors, one or more environmental conditions within the apparatus and external to the apparatus; determine whether one or more sensor data corresponding to the monitored one or more environmental conditions exceed one or more corresponding predetermined thresholds; and, based on a determination that the one or more sensor data corresponding to the monitored one or more environmental conditions exceed one or more corresponding predetermined thresholds, autonomously send, with the one or more first transceivers and via machine-to-machine communications, the one or more sensor data to one or more nodes. In some cases, the one or more IoT-capable sensor devices might comprise at least one of one or more temperature sensors, one or more humidity sensors, one or more accelerometers, one or more vibration sensors, one or more chemical detectors, one or more pressure sensors, one or more weather sensors, one or more wind sensors, one or more moisture sensors, or one or more seismic sensors, and/or the like.

According to some embodiments, the signal distribution system might comprise the wireless transceiver; at least one second processor; and a second non-transitory computer readable medium communicatively coupled to the at least one second processor. The second non-transitory computer readable medium might have stored thereon computer software comprising a second set of instructions that, when executed by the at least one second processor, causes the signal distribution system to: receive a first communications signal; and send, using the wireless transceiver, the first communications signal to the one or more devices external to the housing via the one or more wireless communications channels. In some instances, the second set of instructions, when executed by the at least one second processor, might further cause the signal distribution system to: configure the at least one of the one or more first antennas disposed within the housing or the one or more second antennas embedded in the housing material of the housing to direct the first communications signal along one or more directions in order to send the first communications signal to the one or more devices.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-8 illustrate some of the features of the method, system, and apparatus for implementing telecommunications signal relays, and, more particularly, to methods, systems, and apparatuses for implementing telecommunications signal relays using radiating closures that are at least one of aerial radiating closures, below grade radiating closures, and/or buried radiating closures, as referred to above. The methods, systems, and apparatuses illustrated by FIGS. 1-8 refer to examples of different embodiments that include various components and steps, which can be considered alternatives or which can be used in conjunction with one another in the various embodiments. The description of the illustrated methods, systems, and apparatuses shown in FIGS. 1-8 is provided for purposes of illustration and should not be considered to limit the scope of the different embodiments.

Throughout these embodiments, wireless access points—such as ones operating under any of the IEEE 802.11a/b/g/n/ac/ad/af standards discussed above, and described in detail in the '034, '574, '691, '676, '216, and '665 Applications, which are already incorporated herein by reference in their entirety—may be implemented in any of ground-based signal distribution devices (including, without limitation, the FDH, the NAPs, the handholes, the NIDs, the ONTs, and/or the like), in below grade implementations (including, but not limited to, a closure or container that is disposed in a man hole or hand hole, mostly surrounded by air and other closures, or the like), or in aerial implementations (including, without limitation, an aerial closure or container—including, but not limited to the SLIC™ line of aerial closures by 3M™, or any suitable container that can be suspended in the air (e.g., by wires, cables, support lines, utility poles, and/or the like)). In some embodiments, wireless access points may be disposed within compact devices that are disposed within apical conduit channels, at the top of apical conduit channels, or near the top of apical conduit channels, as described in detail in the '574 Application. In some cases, some or all of these wireless access points may be powered by power lines that are disposed along with the signal lines or fiber lines within the apical conduit system, and such powering of wireless access points is described in detail in the '691 and '676 Applications, already incorporated herein by reference in their entirety. The wireless access points may be part of small cells, micro cells, femto cells, pico cells, and/or the like, as appropriate or desired.

With reference to the figures, FIG. 1 is a schematic diagram illustrating a system 100 for implementing distributed broadband wireless implementation in premises electrical devices, in accordance with various embodiments.

In the non-limiting embodiment of FIG. 1, system 100 might comprise a radiating closure 105, a signal distribution system 110, a wireless transceiver 115, an antenna(s) 120, an Internet of Things ("IoT") sensor device(s) 125 (optional), a power supply 130, a network node 135 (which might include, without limitation, a central office ("CO"), a service node or service provider node, a base unit, a wireless base station, and/or the like), and one or more devices 160a-160n (collectively, "devices 160" or the like). In some embodiments, the signal distribution system 110, which might comprise the wireless transceiver 115, might be disposed within the radiating closure 105. Also disposed within the radiating closure 105 might be the antenna(s) 120, and, according to some embodiments, one or more IoT sensor devices 125. According to some embodiments, the radiating closure 105 might form (or might be) a container or might form (or might be) a lid of a container. In some embodiments, the radiating closure 105 might be one of an aerial radiating closure, a below grade radiating closure, or a buried radiating closure, and/or the like. Herein, an aerial radiating closure might refer to an aerial closure or container—including, but not limited to the SLIC™ line of aerial closures by 3M™, or any suitable container that can be suspended in the air (e.g., by wires, cables, support lines, utility poles, and/or the like)—that can be either lined on an inner surface with antennas and/or hold antennas, cables, and/or other communications equipment, or the like. Herein also, a below grade radiating closure might refer to a closure or container that is disposed in a man hole or hand hole, mostly surrounded by air and other closures, while a buried or direct buried radiating closure might refer to a closure or container that is surrounded by earth.

Merely by way of example, in some aspects, the antenna(s) 120 might include, without limitation, at least one of a plurality of lateral patch antennas, a plurality of arrays of patch antennas, one or more micro-strip patch antennas, a two-dimensional ("2D") leaky waveguide antenna, or a three-dimensional ("3D") array of antenna elements, and/or the like. In some instances, one or more of the at least one of the plurality of lateral patch antennas, the plurality of arrays of patch antennas, the one or more micro-strip patch antennas, the two-dimensional ("2D") leaky waveguide antenna, or the three-dimensional ("3D") array of antenna elements comprise flexible material that allows the one or more of the at least one of the plurality of lateral patch antennas, the plurality of arrays of patch antennas, the one or more micro-strip patch antennas, the two-dimensional ("2D") leaky waveguide antenna, or the three-dimensional ("3D") array of antenna elements to be bent while being disposed within a housing of the radiating closure 105. In some cases, at least one of the antenna(s) 120 might include at least one active antenna element. According to embodiments, the antenna(s) 120 might each transmit and receive wireless broadband signals according to a set of protocols comprising at least one of IEEE 802.11a, IEEE 802.11b, IEEE 802.11g, IEEE 802.11n, IEEE 802.11ac, IEEE 802.11ad, or IEEE 802.11af, and/or the like. Alternatively, or additionally, the antenna(s) 120 might each transmit and receive wireless broadband signals according to a set of protocols comprising at least one of Universal Mobile Telecommunications System ("UMTS"), Code Division Multiple Access ("CDMA"), Time Division Multiple Access ("TDMA"), Global System for Mobile Communication ("GSM"), Long Term Evolution ("LTE"), Personal Communications Service ("PCS"), Advanced Wireless Services ("AWS"), Emergency Alert System ("EAS"), Citizens Band Radio Service ("CBRS"), or Broadband Radio Service ("BRS"), and/or the like.

In some embodiments, system 100 might further comprise one or more servers 140 (optional; also referred to as "service provider servers 140," "network servers 140," "servers 140," or the like), one or more databases 145 (optional) that are associated with the one or more servers 140, one or more networks 150, and one or more telecommunications relay systems 155, and/or the like. System 100 might further comprise one or more customer premises 165a-165n (collectively, "customer premises 165," "premises 165," "locations 165," or the like), one or more devices 170a-170n (collectively, "devices 170," "premises devices 170," "indoor devices 170," or "indoor premises devices 170," or the like), one or more wireless distribution devices 175a-175n (collectively, "wireless distribution devices 175," "devices 175," or the like), and/or the like. The devices 170 and the wireless distribution devices 175 might be disposed or located within one or more of the customer premises 165a-165n, while the devices 160 might be disposed or located outside or external to any of the customer premises 165a-165n.

The wireless transceiver 115 might relay communication signals between a service provider access point (including, but not limited to, CO 135a or service node or base 135b, or the like) and at least one of the one or more devices 160a-160b or the one or more devices 170a-170n, or the like, in some cases via the antenna(s) 120. In some cases, the service provider access point might communicatively couple with the one or more servers 140 (and associated databases 145) via the network(s) 150 (and in some cases, via the one or more telecommunications relay systems 155, which might include, without limitation, one or more wireless network interfaces (e.g., wireless modems, wireless access points, and the like), one or more towers, one or more satellites, and/or the like). The server(s) 140 and/or the network(s) 150 (e.g., the Internet or the like) might exchange data (including, but not limited to, media content, information, VoIP communications, messaging communications (e.g., e-mail messages, short message service ("SMS") messages, chat messages, multimedia messaging service ("MMS") messages, and/or the like), any other data, etc.) with the at least one of the one or more devices 160a-160b or the one or more devices 170a-170n, or the like, via the wireless transceiver 115 of the signal distribution system 110, and in some cases, also via wireless distribution devices 175 or the like. According to some embodiments, wireless distribution devices 175 in one customer premises 165 might relay wireless communications from one to other wireless distribution devices 175 in other customer premises 165. For example, the radiating closure 105 might be located near device 170a, which is located on customer premises 165a, but might be somewhat distant (or perhaps out of wireless range with respect to customer premises 165n). In such a case, the wireless distribution device 175a that is located on customer premises 165a might relay the wireless communications to user device 170n in customer premises 165n, via wireless distribution device 175a (located in customer premises 165a) and via wireless distribution device 175n (located in customer premises 165n) (and via any intermediate wireless distribution devices 175 that are located in intermediate customer premises 165 between customer premises 165a and 165n). In this manner, the wireless distribution devices 175 might relay using any suitable number of hops to connect any user device 170 or other devices that are perhaps not within wireless range of the radiating closure 105. Alternatively, or additionally, user device 170 or other devices might be within wireless range of the radiating closure 105 or some other wireless router or node, but the signal from these sources might be weak (or bandwidth might otherwise be low), in which case, the multiple hops via the wireless distribution devices 175 might supplement the wireless signal so as to boost bandwidth or network speed, or the like.

In operation, according to some embodiments, the signal distribution system 110, which might be disposed within the radiating closure 105, might receive a first communications signal. In some cases, receiving the first communications signal might comprise receiving, with the signal distribution system 110, the first communications signal via one or more signal lines entering the radiating closure through one or more pass-throughs in at least one wall of the radiating closure. The one or more signal lines, in some instances, might include, without limitation, at least one of one or more telecommunications lines, one or more broadband-over-power signal lines, one or more copper cable lines, one or more optical fiber lines, or one or more coaxial cable lines, and/or the like. The wireless transceiver 115 of the signal distribution system 110 might send the first communications signal, via one or more wireless communications channels, to one or more devices 160a-160n that are external to the radiating closure 105 (and, in some cases, to user devices 170a-170n as well, the user devices 170a-170n being disposed or located within customer premises 165a-165n). In some embodiments, the antenna(s) 120—which might comprise at least one of one or more first antennas disposed within the radiating closure (as shown and described below with respect to FIG. 2) or one or more second antennas embedded in a housing material of the radiating closure (as shown and described below with respect to FIG. 3), or a combination of the two—might direct the first communications signal that is sent, via the one or more wireless communications channels, from the wireless transceiver 115 to the one or more devices 160a-160n (and/or user devices 170a-170n), in some cases, directing the first communications signal in multiple different directions (either two or more discretely different directions or in all directions (i.e., radiating radially outward in three-dimensions, similar, but not limited, to radiating from a sphere or radiating from some other three-dimensional object, or the like)).

In some embodiments, the radiating closure 105 might have disposed therein one or more IoT sensor devices 125 (optional), which might monitor one or more environmental conditions within the radiating closure and external to the radiating closure. The one or more environmental conditions being monitored might include, but are not limited to, at least one of temperature, humidity, movement, vibration, presence of particular chemicals, pressure (both atmospheric and physical), weather, wind conditions, moisture, or seismic activity, and/or the like, using corresponding one or more of the following sensors: at least one of one or more temperature sensors, one or more humidity sensors, one or more accelerometers, one or more vibration sensors, one or more chemical detectors, one or more pressure sensors, one or more weather sensors, one or more wind sensors, one or more moisture sensors, or one or more seismic sensors, and/or the like. The one or more IoT-capable sensor devices 125 might, in some cases, determine whether one or more sensor data corresponding to the monitored one or more environmental conditions exceed one or more corresponding predetermined thresholds. If so, the one or more IoT-capable sensor devices might autonomously send, via machine-to-machine communications, the one or more sensor data to one or more network nodes 135. According to some embodiments, the one or more IoT-capable sensor devices might alternatively or additionally autonomously send, via machine-to-machine communications, the one or more sensor data to at least one of the one or more devices 160a-160n and/or user devices 170a-170n.

In general, the radiating closure 120 might be used to host the radio (e.g., wireless transceiver 115 or the like) and antennas 120. Some implementations might include, without limitation, using one radiating closure 105 to contain the antennas 120, using an additional radiating closure 120 to contain only antennas 120 and the radio (as well as additional room or space for extra closure space or the like), adding a terminal-shaped type of antenna, using a radiating closure 105 (such as a regular SLIC™ aerial terminal or the like to house one or more larger antennas 120, in addition to the terminal opening providing optional additional access to the radios and other flat-larger antennas (such as shown and described below with respect to FIG. 4A, or the like), and/or the like. In some cases, microstrip patch antennas might be a perfect fit for the design as such antennas can be wrapped around and inserted in the radiating closure 105 (such as shown and described below with respect to FIG. 4B, or the like). Although microstrip patch antennas as mentioned above, the various embodiments are not so limited, and any suitable type of antenna may be used (for example, but not limited to, those as shown and described below with respect to FIGS. 4A-4D and 5A-5K or the like), including passive arrays (where amplitude and/or phase, or simply signal preconditioning, might perform most of the beam forming or steering, or the like) and active arrays (where amplifiers on individual elements might perform the beam forming or steering, or the like).

Another important aspect of the various embodiments is that line powering or power lines may be available in the radiating closures or terminals 105. Backhaul communication lines may also be present. The general approach may be to use any frequencies commonly used for fixed and mobile wireless access, including, but not limited to, CDMA and LTE in all 3G and 4G bands, WiFi and its evolutions in unlicensed bands, Internet of Things ("IoT") classic frequencies and standards (like LoRa, 6LowPAN, and/or the like), etc, as well as those frequencies associated with the various communications protocols described above.

With respect to the aerial case or closure, these either may be lines with antennas inside the closure or may have a housing or shell that is embedded with antennas. In some cases, the aerial closure might be made of a hollow plastic shell. At most frequencies, the manufacturing plastics might have electric permittivities close to one, and might be nearly transparent to RF waves, so they would make an ideal material support for class antenna designs or the like. Regarding below grade and direct buried cases, there are two distinct approaches to adapt wireless communications to these types of closures. The first is to use low spectrum that propagates well through the ground, while the second is to increase the number of elements to obtain much higher gains. Both apply well to the various embodiments of the radiating closure.

Generally speaking, a wide range of useful spectra is relevant both to below ground implementations as well as aerial implementations, including, without limitation, WiFi frequencies (e.g., 2.4 GHz, 5 GHz, etc.), cellular frequencies (e.g., cellular, PCS, AWS, WBS, EBS/BRS, CBRS, etc.). In some embodiments, closure antenna designs might include antenna elements all around, and may focus on two slightly different approaches depending on spectrum (as discussed above).

Regarding the use of lower spectrum, ideal candidates of the spectrum for below ground implementations might include, but are not limited to, TVWS (e.g., UHF, VHF, etc.), 600 MHz, 700 MHz, and some unlicensed frequencies—including low frequencies such as IoT slivers of spectrum at 300-400 MHz, 900 MHz unlicensed, etc.—, and/or the like. In general, below grade and direct buried closures can be larger, and good antenna design sizes can be supported. In some cases, some closures might be metallic (such as the stainless steel closures like the Armadillo by Preformed, or the like). The metallic shell of the closure can be used as the ground plane that is often needed for patch antenna designs or the like.

Regarding the use of higher gain at higher spectrum, the alternative to the low spectrum approach is to multiply antenna elements to obtain higher gain. For example, typical rectangular patch antennas, for instance, can achieve gains of 6 to 9 dBi, on a size of around $\lambda_{eff}/2=\lambda\varepsilon_r/2$. The relative permittivity $\varepsilon_r$ of the substrate varies, from 1 with air patches to 2 to 10 or even 20 depending on substrate types and properties. In addition, some room is required for feed lines, and for separation from other neighboring patches, so a typical separation is commonly accepted around $\lambda_{eff}$. At high frequency, that distance can be small—e.g., smaller than 5 mm (for f>30 GHz, and $\varepsilon_r$>2). As a result, a 5×5 cm square, for instance, can host 100 patches, which can produce a beam combining gain on the order of 18 dBi higher; in some cases, doubling the number of patches can produce gain increase of ~3 dB. Further, more patches around the closure can produce more beams in different directions. In addition, combining the patches—some for beam gain, some for different beam directions can produce a very versatile, very powerful antenna capable of beam steering, beam forming, and MU-MIMO in many directions—either as required by fixed wireless access, or for mobile applications, or the like.

With respect to the use of IoT sensors within the radiating closures, many IoT sensor types that are currently available are relatively low in cost, which allows freedom in terms of implementation, especially with expanded use of IoT sensors and IoT sensor devices within multiple radiating closures within a population area. In aerial closures, for example, temperature, humidity, acceleration/motion, and/or the like may be monitored using such IoT sensors, with proper or appropriate alarms being triggered when the sensors detect anything exceptional in terms of wind, solar, weather, and/or the like that can cause outages or the like. In below ground closures, for instance, vibration, certain chemical presence, humidity/moisture, pressure (e.g., beyond crush pressure that is rated for that closure, etc.), and/or the like may be monitored using such IoT sensors, proper or appropriate alarms being triggered when the sensors sense levels beyond associated thresholds (that may be predetermined for the particular type of sensor) to detect possible or impending outage risks or the like.

These and other functions of the system 100 (and its components) are described in greater detail below with respect to FIGS. 2-6.

FIGS. 2A-2D (collectively, "FIG. 2") are schematic diagrams illustrating various embodiments 200, 200', 200", and 200''' of a radiating closure that may be used for implementing telecommunications signal relays.

Figure 2A:
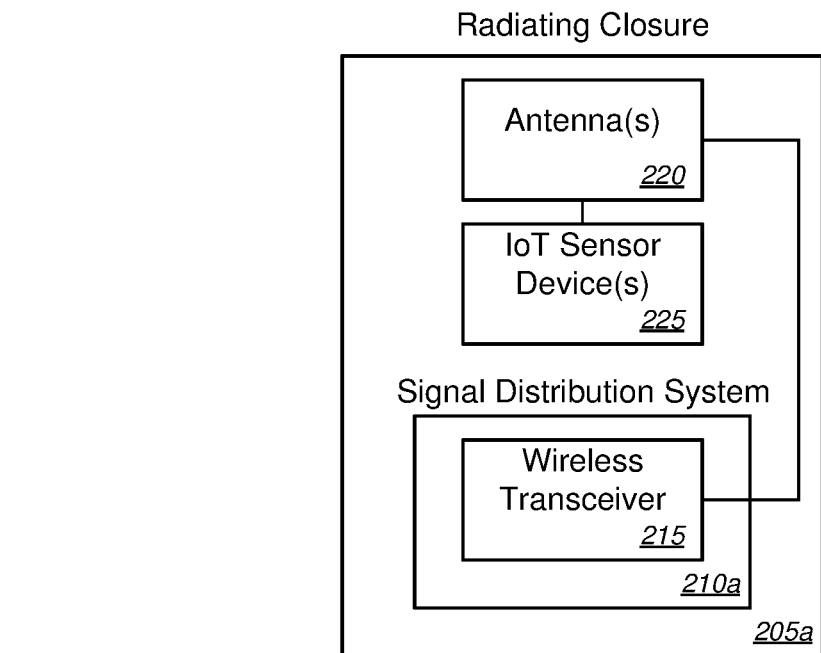
FIGS. 2A-2D are schematic diagrams illustrating various embodiments of a radiating closure that may be used for implementing telecommunications signal relays.

With reference to the non-limiting embodiment 200 of FIG. 2A, radiating closure 205a might comprise a signal distribution system 210a, which might comprise a wireless transceiver 215. Radiating closure 205a might further comprise one or more antennas 220 that are disposed or placed within the radiating closure 205a (i.e., in an interior space of the radiating closure 205a). Radiating closure 205a might further comprise one or more IoT sensor devices 225. The wireless transceiver 215 might be communicatively coupled (either via wired communication or via wireless communication when the wireless transceiver wirelessly sends a signal, or the like) to the one or more antennas 220. The one or more IoT sensor devices 225 might similarly be communicatively coupled (either via wired communication or via wireless communication when the wireless transceiver wirelessly sends an IoT machine-to-machine signal, or the like) to the one or more antennas 220. The one or more antennas 220 then might direct the signals to devices external to the radiating closure 205a, in some cases, in multiple different directions or the like.

The radiating closure 205a, the signal distribution system 210a, the wireless transceiver 215, the one or more antennas 220, and the one or more IoT sensor devices 225 of embodiment 200 of FIG. 2A might be similar, if not identical, to the radiating closure 105, the signal distribution system 110, the wireless transceiver 115, the antenna(s) 120, and the IoT sensor device(s) 125 of system 100 of FIG. 1, and the descriptions of these components of system 100 of FIG. 1 are applicable to the corresponding components of embodiment 200 of FIG. 2A, respectively.

Figure 2B:
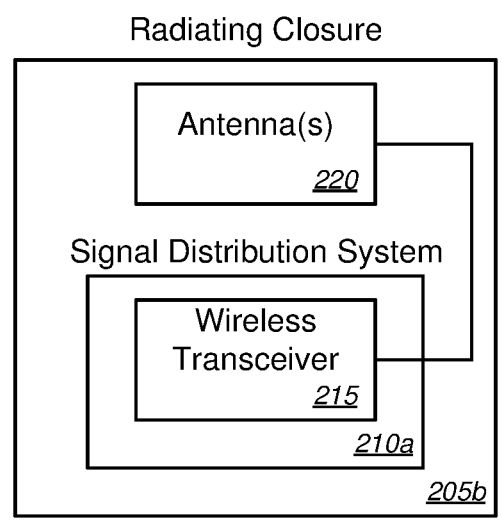

The non-limiting embodiment 200' of FIG. 2B is similar, if not identical, to the embodiment 200 of FIG. 2A, except that the radiating closure 205b does not contain any IoT sensor devices. The radiating closure 205b, the signal distribution system 210a, the wireless transceiver 215, and the one or more antennas 220 of embodiment 200' of FIG. 2B might be similar, if not identical, to the radiating closure 105, the signal distribution system 110, the wireless transceiver 115, and the antenna(s) 120 of system 100 of FIG. 1, and the descriptions of these components of system 100 of FIG. 1 are applicable to the corresponding components of embodiment 200' of FIG. 2B, respectively.

Figure 2C:
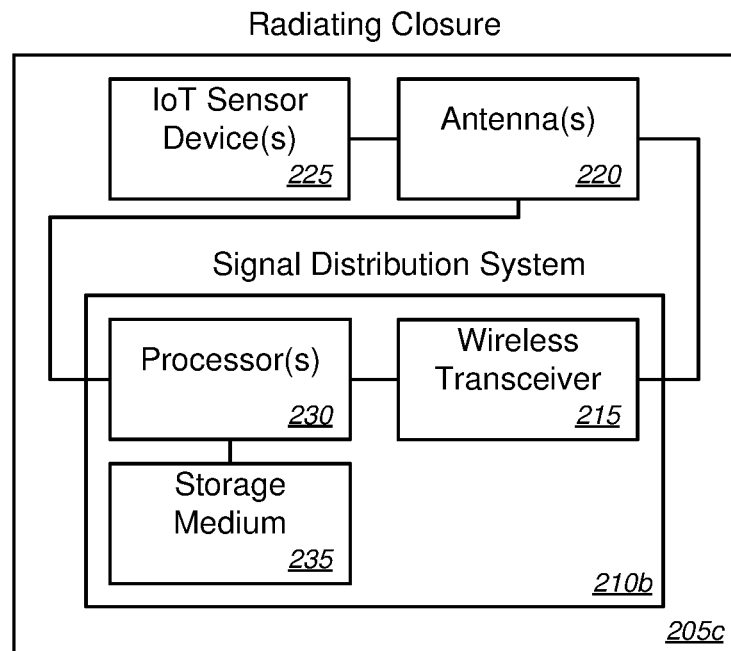

The non-limiting embodiment 200" of FIG. 2C is similar, if not identical, to the embodiment 200 of FIG. 2A, except that the signal distribution system 210b further comprises one or more processors 230 and a storage medium 235 on which might be stored computer software or code that, when executed by the one or more processors 230, causes the signal distribution system 210b to perform the functions described in detail above with respect to signal distribution 110 of system 100 of FIG. 1. In some embodiments, the one or more processors 230 might also send control signals to the one or more antennas 220 to dynamically adjust, modify, or change the phase and gain of each antenna element in the one or more antennas 220 to create different antenna needs as required, including, but not limited to, beamforming or beam steering in order to maximize transmission in one direction, or more generally for MIMO, and/or the like. The radiating closure 205c, the signal distribution system 210b, the wireless transceiver 215, the one or more antennas 220, and the one or more IoT sensor devices 225 of embodiment 200" of FIG. 2C might be similar, if not identical, to the radiating closure 105, the signal distribution system 110, the wireless transceiver 115, the antenna(s) 120, and the IoT sensor device(s) 125 of system 100 of FIG. 1, and the descriptions of these components of system 100 of FIG. 1 are applicable to the corresponding components of embodiment 200" of FIG. 2C, respectively.

Figure 2D:
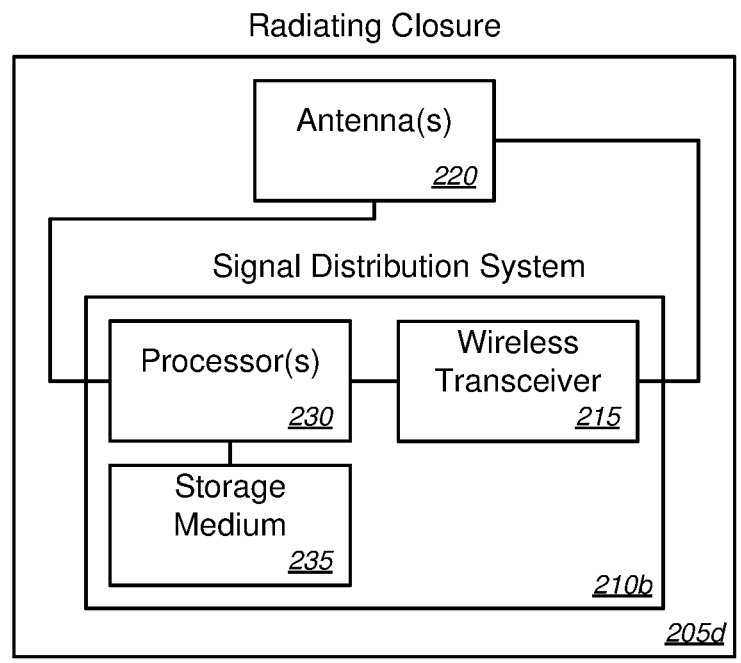

The non-limiting embodiment 200''' of FIG. 2D is similar, if not identical, to the embodiment 200' of FIG. 2B, except that the signal distribution system 210b further comprises one or more processors 230 and a storage medium 235 on which might be stored computer software or code that, when executed by the one or more processors 230, causes the signal distribution system 210b to perform the functions described in detail above with respect to signal distribution 110 of system 100 of FIG. 1. In some embodiments, as in the embodiment 200", the one or more processors 230 might also send control signals to the one or more antennas 220 to dynamically adjust, modify, or change the phase and gain of each antenna element in the one or more antennas 220 to create different antenna needs as required, including, but not limited to, beamforming or beam steering in order to maximize transmission in one direction, or more generally for MIMO, and/or the like. The radiating closure 205d, the signal distribution system 210b, the wireless transceiver 215, and the one or more antennas 220 of embodiment 200''' of FIG. 2D might be similar, if not identical, to the radiating closure 105, the signal distribution system 110, the wireless transceiver 115, and the antenna(s) 120 of system 100 of FIG. 1, and the descriptions of these components of system 100 of FIG. 1 are applicable to the corresponding components of embodiment 200''' of FIG. 2D, respectively.

FIGS. 3A-3D (collectively, "FIG. 3") are schematic diagrams illustrating various embodiments 300, 300', 300'', and 300''' of a radiating closure having embedded antennas within a housing thereof that may be used for implementing telecommunications signal relays.

Figure 3A:
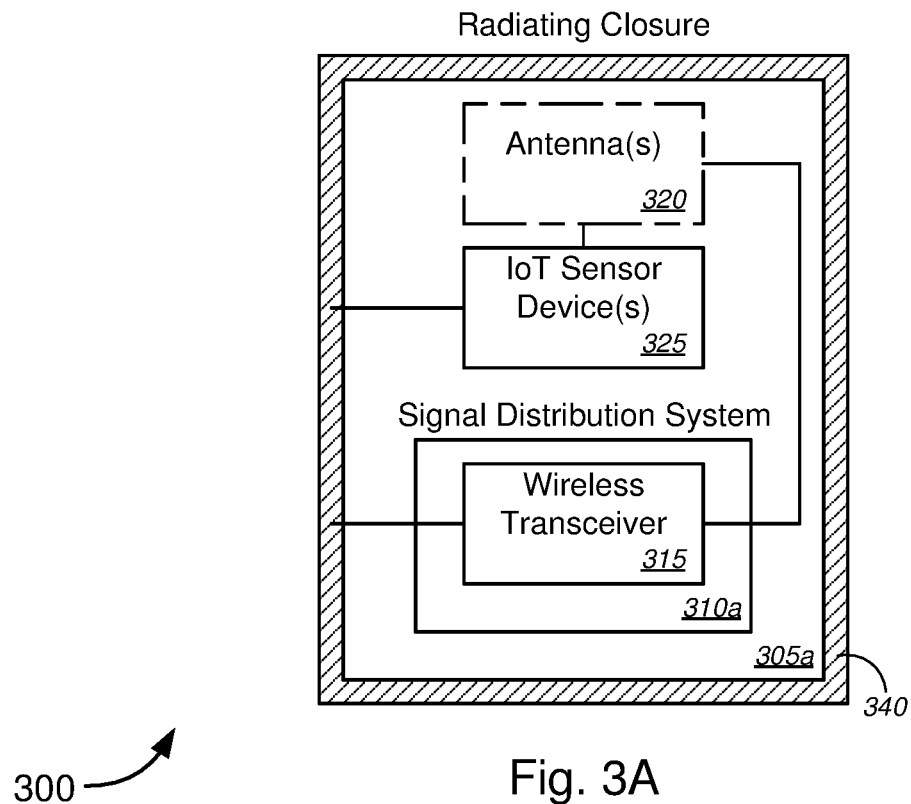
FIGS. 3A-3D are schematic diagrams illustrating various embodiments of a radiating closure having embedded antennas within a housing thereof that may be used for implementing telecommunications signal relays.

With reference to the non-limiting embodiment 300 of FIG. 3A, radiating closure 305a might comprise a signal distribution system 310a, which might comprise a wireless transceiver 315. Radiating closure 305a might further comprise one or more antennas 320 that are disposed or placed within the radiating closure 305a (i.e., in an interior space of the radiating closure 305a) (optional). Radiating closure 305a might further comprise one or more IoT sensor devices 325. Radiating closure 305a might further comprise a housing 340 in which one or more second antennas might be embedded (or might otherwise be formed within the housing 340). The wireless transceiver 315 might be communicatively coupled (either via wired communication or via wireless communication when the wireless transceiver wirelessly sends a signal, or the like) to the embedded second antennas (and, in some cases, to the one or more antennas 320 as well). The one or more IoT sensor devices 325 might similarly be communicatively coupled (either via wired communication or via wireless communication when the wireless transceiver wirelessly sends an IoT machine-to-machine signal, or the like) to the embedded second antennas (and, in some cases, to the one or more antennas 320 as well). The embedded second antennas (and/or to the one or more antennas 320) then might direct the signals to devices external to the radiating closure 305a, in some cases, in multiple different directions or the like.

The radiating closure 305a, the signal distribution system 310a, the wireless transceiver 315, the one or more antennas 320 and/or the embedded second antennas in housing 340, and the one or more IoT sensor devices 325 of embodiment 300 of FIG. 3A might be similar, if not identical, to the radiating closure 105, the signal distribution system 110, the wireless transceiver 115, the antenna(s) 120, and the IoT sensor device(s) 125 of system 100 of FIG. 1, and the descriptions of these components of system 100 of FIG. 1 are applicable to the corresponding components of embodiment 300 of FIG. 3A, respectively.

Figure 3B:
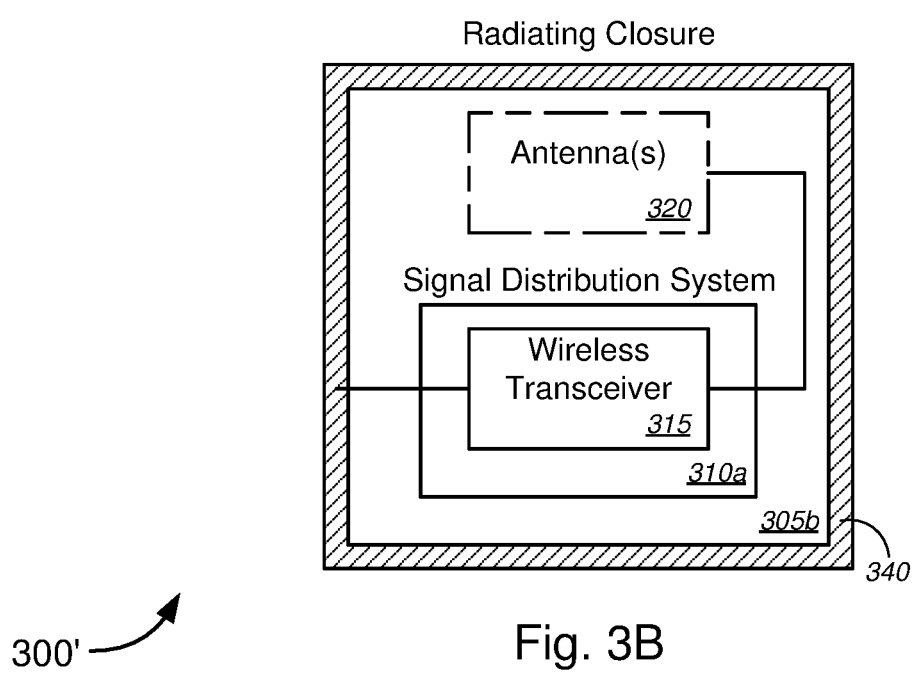

The non-limiting embodiment 300' of FIG. 3B is similar, if not identical, to the embodiment 300 of FIG. 3A, except that the radiating closure 305b does not contain any IoT sensor devices. The radiating closure 305b, the signal distribution system 310a, the wireless transceiver 315, and the one or more antennas 320 and/or the embedded second antennas in housing 340 of embodiment 300' of FIG. 3B might be similar, if not identical, to the radiating closure 105, the signal distribution system 110, the wireless transceiver 115, and the antenna(s) 120 of system 100 of FIG. 1, and the descriptions of these components of system 100 of FIG. 1 are applicable to the corresponding components of embodiment 300' of FIG. 3B, respectively.

Figure 3C:
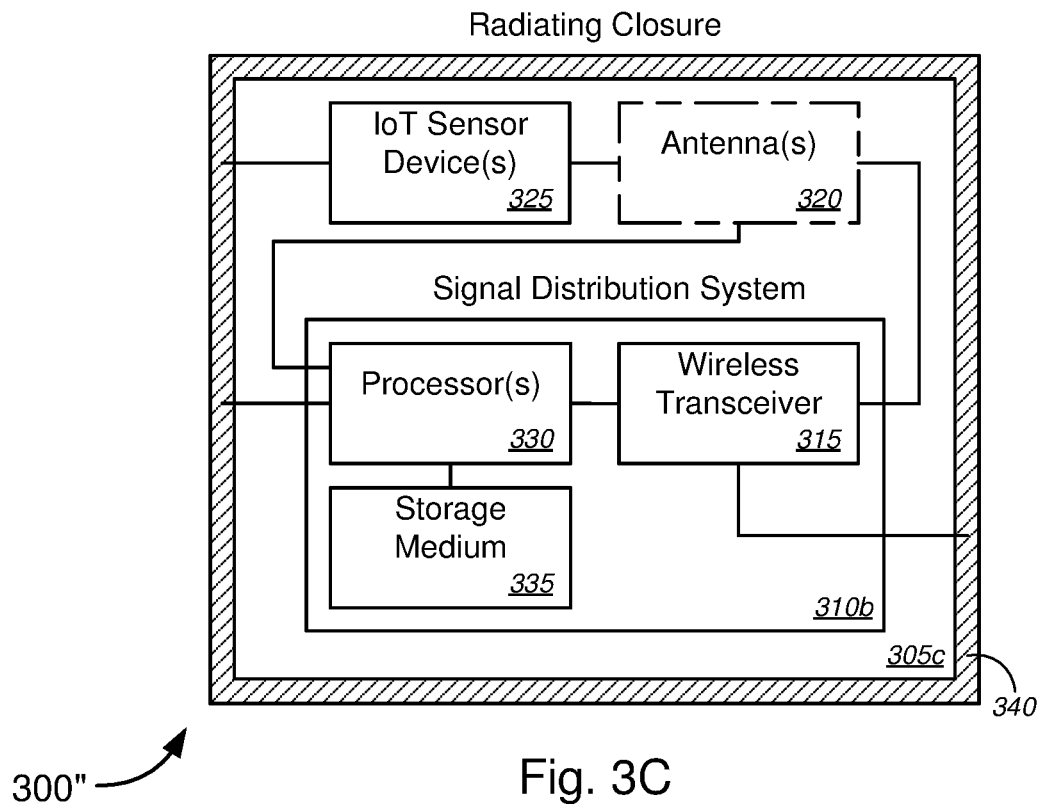

The non-limiting embodiment 300'' of FIG. 3C is similar, if not identical, to the embodiment 300 of FIG. 3A, except that the signal distribution system 310b further comprises one or more processors 330 and a storage medium 335 on which might be stored computer software or code that, when executed by the one or more processors 330, causes the signal distribution system 310b to perform the functions described in detail above with respect to signal distribution 110 of system 100 of FIG. 1. In some embodiments, the one or more processors 330 might also send control signals to the one or more antennas 320 to dynamically adjust, modify, or change the phase and gain of each antenna element in the one or more antennas 320 to create different antenna needs as required, including, but not limited to, beamforming or beam steering in order to maximize transmission in one direction, or more generally for MIMO, and/or the like. The radiating closure 305c, the signal distribution system 310b, the wireless transceiver 315, the one or more antennas 320 and/or the embedded second antennas in housing 340, and the one or more IoT sensor devices 325 of embodiment 300'' of FIG. 3C might be similar, if not identical, to the radiating closure 105, the signal distribution system 110, the wireless transceiver 115, the antenna(s) 120, and the IoT sensor device(s) 125 of system 100 of FIG. 1, and the descriptions of these components of system 100 of FIG. 1 are applicable to the corresponding components of embodiment 300'' of FIG. 3C, respectively.

Figure 3D:
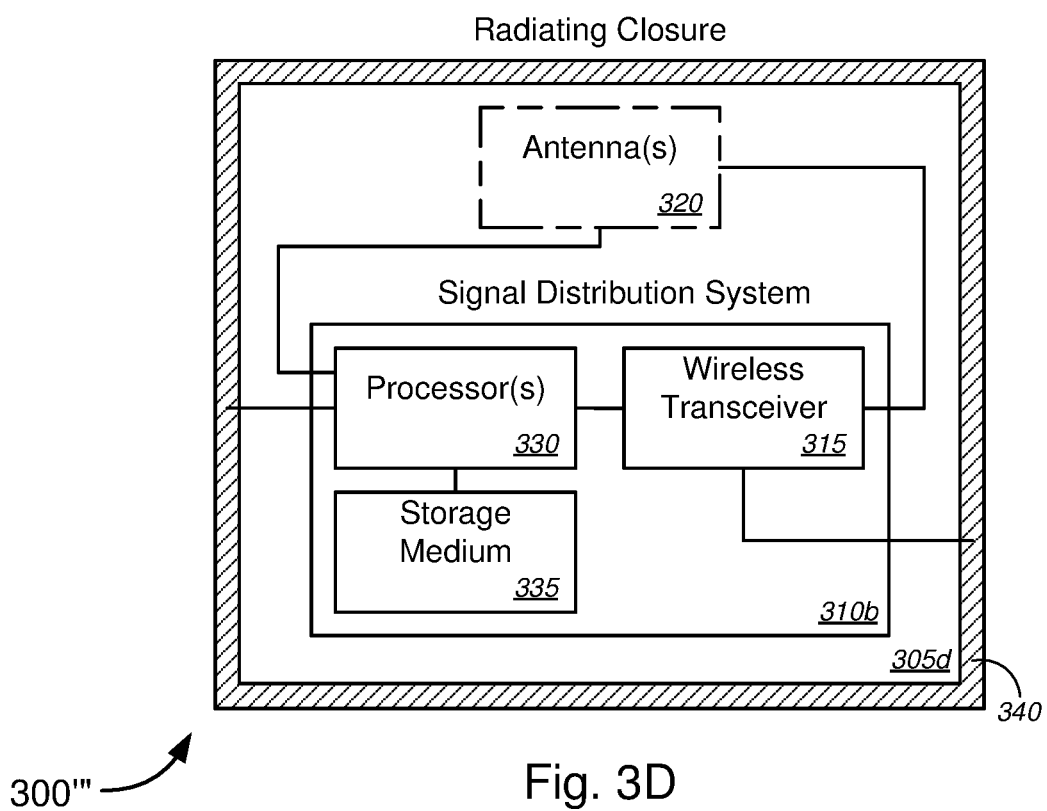

The non-limiting embodiment 300''' of FIG. 3D is similar, if not identical, to the embodiment 300' of FIG. 3B, except that the signal distribution system 310b further comprises one or more processors 330 and a storage medium 335 on which might be stored computer software or code that, when executed by the one or more processors 330, causes the signal distribution system 310b to perform the functions described in detail above with respect to signal distribution 110 of system 100 of FIG. 1. In some embodiments, as in embodiment 300'', the one or more processors 330 might also send control signals to the one or more antennas 320 to dynamically adjust, modify, or change the phase and gain of each antenna element in the one or more antennas 320 to create different antenna needs as required, including, but not limited to, beamforming or beam steering in order to maximize transmission in one direction, or more generally for MIMO, and/or the like. The radiating closure 305d, the signal distribution system 310b, the wireless transceiver 315, and the one or more antennas 320 and/or the embedded second antennas in housing 340 of embodiment 300''' of FIG. 3D might be similar, if not identical, to the radiating closure 105, the signal distribution system 110, the wireless transceiver 115, and the antenna(s) 120 of system 100 of FIG. 1, and the descriptions of these components of system 100 of FIG. 1 are applicable to the corresponding components of embodiment 300''' of FIG. 3D, respectively.

Figure 4B:
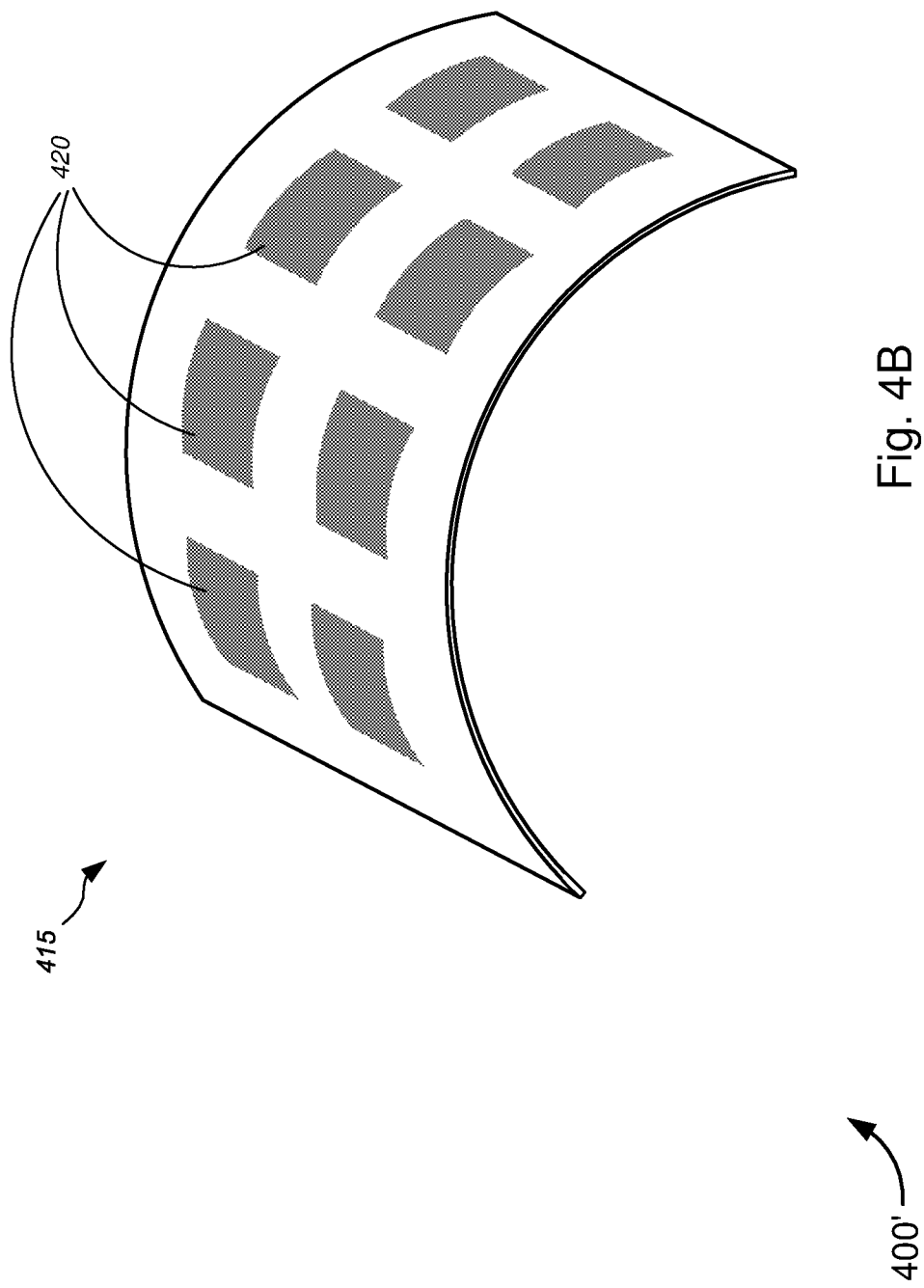
Figure 4C:
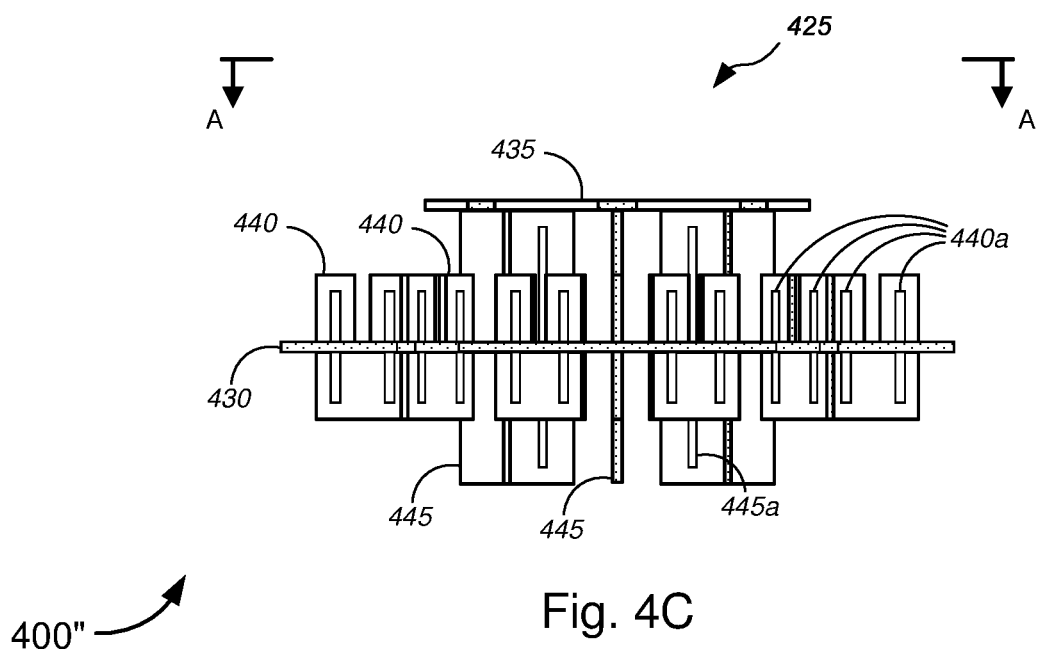
Figure 4D:
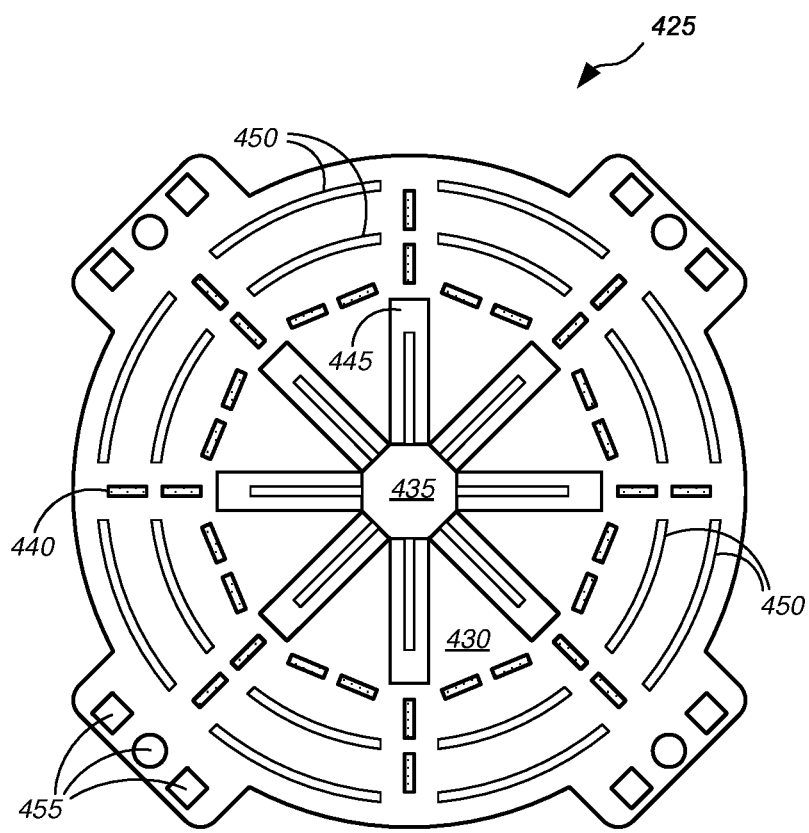

FIGS. 4A-4D (collectively, "FIG. 4") are general schematic diagrams illustrating various embodiments 400, 400', and 400'' of two- and three-dimensional antenna arrays, systems, or designs that may be used in the radiating closure for implementing telecommunications signal relays. FIGS. 4A and 4B are general schematic diagrams illustrating exemplary two-dimensional antenna systems or antenna designs, while FIGS. 4C and 4D are general schematic diagrams illustrating an exemplary three-dimensional antenna system or antenna design.

Some access points ("APs") have very small antennas, directly on a circuit board (not shown). These are essentially microstrip patch antennas (similar to the lateral patch antennas as described below with respect to FIGS. 5A-5D), which are a classic, well-known type of antenna that usually comprises a ground plate, a dielectric substrate, and a top conducting layer made of patches of various shapes (including, but not limited to, rectangular, circular, or other radiating element shapes) and feed-lines. The top layer is initially a conducting plane, and is etched to produce whatever design is printed on it.

Some APs have more elaborate antennas, and are still imbedded in a circuit board, but allow for many more elements—some horizontal, some vertical—for beamforming, smart antennas, multiple-input multiple-output ("MIMO"), and/or the like. The more elements, the more antenna patterns can be modified as needed in order to create antenna gain maxima in a direction needed for propagation and/or minima in a direction where an interference is detected.

Antenna patterns are made of combinations of many radiators called antenna elements. Each antenna element is fed by some type of transmission line (including, without limitation, co-axial line, printed circuit board parallel waveguide, etc.). The phase and amplitude of these feeding lines of the many antenna elements combine into a main beam. This combination can be static, in order to design a certain antenna or a given gain, beamwidth, etc. More recently, smart antennas add dynamic aspects, so the phase and gain of each element can be changed to create different antenna needs as required, including, but not limited to, beamforming or beam steering in order to maximize transmission in one direction, or more generally for MIMO. Classic antenna theory designs may be employed to combine all these elements.

Active antenna elements may be fed by feed line signals and may radiate into the air to transmit—and conversely to capture energy from the air and focus it into the feed lines to receive—signals. There is a fundamental reciprocity theorem of electromagnetic signals, so transmit and receive antenna designs are the same—some antennas can be used for both (i.e., duplex mode), while others are used only for direction (i.e., simplex mode), depending on design.

In addition to active antenna elements, there are passive elements used to modify the radiation pattern. Such passive elements are called directors or reflectors. They consist of dipoles (e.g., rods), patches, plates, or the like, of metal or dielectric materials. Usually, large elements placed behind an active element mostly reflect signals, and are called reflectors. Smaller elements placed at appropriate places in front of the active elements are called directors, and they focus the radiated energy a certain way. Multi-antenna systems like that can be passive, where phase can be changed with feed line delays, attenuators, and/or the like. More elaborate (i.e., smart antennas or smart arrays) use active devices that can even amplify signals to some elements.

With reference to the non-limiting embodiment 400 of FIG. 4A, an antenna 405 might comprise an array of antennas 410a that are connected to common microstrips 410b. In some cases, the array of antennas 410a might be an array of lateral patch antennas. In the non-limiting embodiment 400, the array of antennas 410a might comprise four sets of four antennas 410a, each set connected via microstrips 410b to an adjacent set, with pairs of sets of antennas connected via microstrips 410b, and so on. Each antenna 410a might have a shape, size, and configuration relative to adjacent antennas (or relative to the other antennas in the array) designed to transmit and receive signals at a desired frequency selected from a group of frequencies associated with one or more of the following protocols: IEEE 802.11a, IEEE 802.11b, IEEE 802.11g, IEEE 802.11n, IEEE 802.11ac, IEEE 802.11ad, or IEEE 802.1af, and/or the like; Universal Mobile Telecommunications System ("UMTS"), Code Division Multiple Access ("CDMA"), Time Division Multiple Access ("TDMA"), Global System for Mobile Communication ("GSM"), Long Term Evolution ("LTE"), Personal Communications Service ("PCS"), Advanced Wireless Services ("AWS"), Emergency Alert System ("EAS"), Citizens Band Radio Service ("CBRS"), or Broadband Radio Service ("BRS"), and/or the like; etc.

Although FIG. 4A depicts an array of 16 antennas 410a in sets of four that are connected via the microstrips 410b, and in the configuration, as shown, the various embodiments are not so limited, and the array of antennas may be made up of any suitable number of antennas in any suitable grouping, arrangement, and configuration as needed or as desired, with each antenna being of any suitable shape, size, and orientation relative to adjacent antennas (or relative to the other antennas in the array) as needed or as desired. In some instances, the antenna 405 might be a flat antenna or might have a substrate or support that is sufficiently thin or flexible to bend, similar to the antenna 415 as shown and described below with respect to FIG. 4B.

Turning to the non-limiting embodiment 400' of FIG. 4B, antenna 415 might comprise an array of antennas 420 (which might, in some cases, be connected via microstrips or the like, as shown and described above with respect to FIG. 4A). As illustrated in FIG. 4B, the antenna 415 might have a substrate or base material (as well as antenna materials, microstrip materials, etc.) that is either sufficient thin and/or sufficiently flexible in order for the antenna 415 to be bent. In this manner, the antenna 415 may be bent in order to fit within a circular, cylindrical, or otherwise curved container or radiating closure, and/or in order to provide desired curved propagation characteristics, or the like.

Antenna 415 and the array of antennas 420 of embodiment 400' of FIG. 4B are otherwise similar, if not identical, to antenna 405 and the array of antennas 410a of embodiment 400 of FIG. 4A, respectively, and the descriptions of these components of embodiment 400 are applicable to the corresponding components of embodiment 400', respectively.

FIGS. 4C and 4D depict an embodiment 400" of an antenna 425 comprising a plurality of antenna elements. In some embodiments, at least one set of antenna elements are active elements that vary feeds to different elements for beam forming, MIMO, and/or the like. Antenna 425, in some cases, might comprise a main circuit board 430 comprising a number of antenna elements. Antenna 425 might also comprise an automatic signal optimizer 435, which might modify radio frequency ("rf") transmissions based on the orientation of the access point device. Antenna 425 might further comprise a plurality of first components 440 and a plurality of second components 445, the first and second components being of different size, each of the first and second components 440 and 445 comprising vertically polarized antenna elements 440a and 445a, respectively. With reference to FIG. 4D, which is a top plan view of the view shown in FIG. 4C (as shown along the A-A direction in FIG. 4C), the main circuit board 430 might comprise a plurality of third components 450 comprising an array of horizontally polarized antenna elements. The antenna 425, in some embodiments, can integrate high-gain, directional antenna elements (including, but not limited to, the horizontally and vertically polarized antenna elements) to deliver increased signal gain compared to conventional antennas that have only one of horizontally polarized antenna elements or vertically polarized antenna elements. In some cases, antenna 425 might further comprise a plurality of alignment or mounting holes 455 that allow the antenna 425 to be aligned and mounted into suitable positions within a container or radiating closure, or the like. Antennas such as antenna 425 may be available from Ruckus Wireless, inc. or the like.

For embodiments 400, 400', and 400", antenna separation between adjacent antennas in each array are typically half-lambda separation or λ/2 separation (where lambda or λ might refer to the wavelength of the rf signal(s)). This allows for some intertwining between patches, particular, intertwining between patches of two or more different arrays of patches. In some embodiments feed lines to the multiple arrays can be separate, or may be combined for dual-/multi-mode devices. The larger number of antenna or antenna elements allow for higher gain to be obtained. For example, typical rectangular patch antennas, for instance, can achieve gains of 6 to 9 dBi, on a size of around $\lambda_{eff}/2=\varepsilon_r/2$. The relative permittivity $\varepsilon_r$ of the substrate varies, from 1 with air patches to 2 to 10 or even 20 depending on substrate types and properties. In addition, some room is required for feed lines, and for separation from other neighboring patches, so a typical separation is commonly accepted around $\lambda_{eff}$. At high frequency, that distance can be small—e.g., smaller than 5 mm (for f>30 GHz, and $\varepsilon_r$>2). As a result, a 5×5 cm square, for instance, can host 100 patches, which can produce a beam combining gain on the order of 18 dBi higher; in some cases, doubling the number of patches can produce gain increase of ~3 dB. Further, more patches around the closure can produce more beams in different directions. In addition, combining the patches—some for beam gain, some for different beam directions can produce a very versatile, very powerful antenna capable of beam steering, beam forming, and MU-MIMO in many directions—either as required by fixed wireless access, or for mobile applications, or the like.

FIGS. 5A-5K (collectively, "FIG. 5") are general schematic diagrams illustrating various embodiments 500, 500', 500", 500''', and 500'''' of antennas or antenna designs that may be used in the radiating closure for implementing telecommunications signal relays, in accordance with various embodiments.

In particular, FIGS. 5A-5D show various embodiments 500 and 500' of lateral patch antennas (or arrays of lateral patch antennas), while FIGS. 5E-5H show various embodiments 500" and 500''' of leaky waveguide antennas (also referred to as "planar antennas," "planar waveguide antennas," "leaky planar waveguide antennas," or "2D leaky waveguide antennas," and/or the like). FIGS. 5I-5K show various embodiments 500'''' of reversed F antennas or planar inverted F antennas ("PIFA").

Figure 5A:
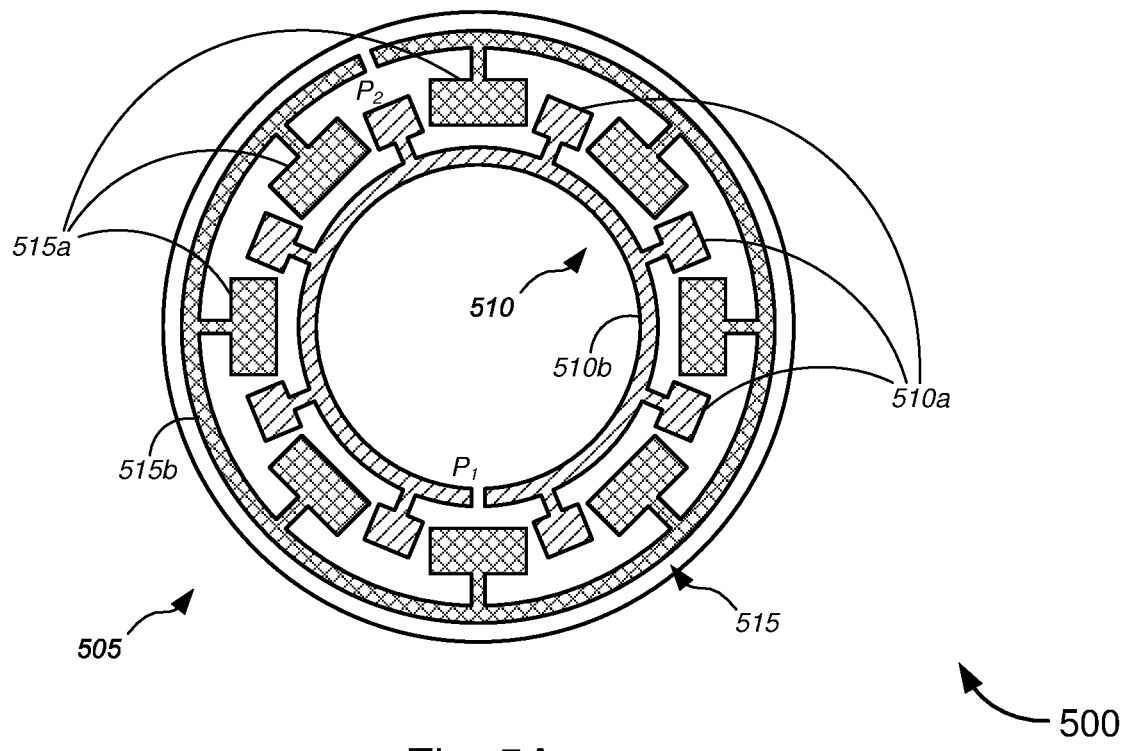

FIG. 5A shows antenna 505, which includes a plurality of arrays of lateral patch antennas comprising a first array 510 and a second array 515. Antenna 505, in some embodiments, may correspond to antenna 245, which is part of lid 215, either disposed completely within the lid 215, disposed below (but mounted to) the lid 215, or disposed partially within, and partially extending below, the lid 215 of FIG. 2 of the '460 Application (which has already been incorporated herein by reference in its entirety for all purposes), or the like. In some instances, antenna 505 might correspond to an antenna, which is disposed below lid 215, either disposed within container 205 (as in the embodiments of FIGS. 2C-2H), disposed with a buried network access point device (as in the embodiment of FIGS. 2I and 2J), mounted within upper portion of pedestal 215 (such as pedestals of the embodiments of FIGS. 2A and 2B), or otherwise disposed under cover 215 (as in the embodiment of FIG. 2F, 2H, 2K-2M) of FIG. 2 of the '460 Application, or the like.

Alternative to these various embodiments of FIG. 2 of the '460 Application, the antenna may be disposed within an aerial radiating closure or in a below grade structure, as described in detail above with respect to FIG. 1.

In the non-limiting example of FIG. 5A, the first array of lateral patch antennas 510 might comprise x number of lateral patch antennas 510a connected to a common microstrip 510b (in this case, x=8). Each lateral patch antenna 510a has shape and size designed to transmit and receive rf signals at a frequency of about 5 GHz. At least one end of microstrip 510b communicatively couples with a first port $P_1$, which communicatively couples, via cable distribution/splicing system 225b (and via container 205) of FIG. 2 of the '460 Application or via signal distribution system 110, 210, or 310 of FIGS. 1-3 above (which might be disposed in an aerial radiating closure, a below grade radiating closure, or a buried radiating closure), or the like, to one or more of the at least one optical fiber line, the at least one conductive signal line (including, but not limited to, copper data lines, copper video lines, copper voice lines, or any suitable (non-optical fiber) data cables, (non-optical fiber) video cables, or (non-optical fiber) voice cables, and/or the like), and/or the like.

Also shown in the non-limiting example of FIG. 5A, the second array of lateral patch antennas 515 might likewise comprise y number of lateral patch antennas 515a connected to a common microstrip 515b (in this case, y=8). In some embodiments x equals y, while in other embodiments, x might differ from y. Each lateral patch antenna 515a has shape and size designed to transmit and receive rf signals at a frequency of about 2.4 GHz. At least one end of microstrip 515b communicatively couples with a second port $P_2$, which communicatively couples, via cable distribution system 225 (and via container 205) of FIG. 2 of the '460 Application or via signal distribution system 110, 210, or 310 of FIGS. 1-3 above (which might be disposed in an aerial radiating closure, a below grade radiating closure, or a buried radiating closure), or the like, to one or more of the at least one optical fiber line, the at least one conductive signal line (including, but not limited to, copper data lines, copper video lines, copper voice lines, or any suitable (non-optical fiber) data cables, (non-optical fiber) video cables, or (non-optical fiber) voice cables, and/or the like), and/or the like. In some embodiments, the first port $P_1$ and the second port $P_2$ might communicatively couple to the same one or more of the at least one optical fiber line, the at least one conductive signal line, and/or the like, while in other embodiments, the first port $P_1$ and the second port $P_2$ might communicatively couple to different ones or more of the at least one optical fiber line, the at least one conductive signal line, and/or the like.

Although 8 lateral patch antennas are shown for each of the first array 510 or the second array 515 (i.e., x=8; y=8), any suitable number of lateral patch antennas may be utilized, so long as: each lateral patch antenna remains capable of transmitting and receiving data, video, and/or voice rf signals at desired frequencies, which include, but are not limited to, 600 MHz, 700 MHz, 2.4 GHz, 5 GHz, 5.8 GHz, and/or the like; each lateral patch antenna has wireless broadband signal transmission and reception characteristics in accordance with one or more of IEEE 802.11a, IEEE 802.11b, IEEE 802.11g, IEEE 802.11n, IEEE 802.11ac, IEEE 802.11ad, and/or IEEE 802.11af protocols; and/or each lateral patch antenna has wireless broadband signal transmission and reception characteristics in accordance with one or more of Universal Mobile Telecommunications System ("UMTS"), Code Division Multiple Access ("CDMA"), Time Division Multiple Access ("TDMA"), Global System for Mobile Communication ("GSM"), Long Term Evolution ("LTE"), Personal Communications Service ("PCS"), Advanced Wireless Services ("AWS"), Emergency Alert System ("EAS"), Citizens Band Radio Service ("CBRS"), or Broadband Radio Service ("BRS"), and/or the like.

Further, although 2 arrays of patches are shown in FIG. 5A, any number of arrays may be used, including, but not limited to, 1, 2, 3, 4, 6, 8, or more. Each array has a feeding structure, not unlike the microstrip patch feed design shown in FIG. 5A (or in FIG. 5C). In some embodiments, multiple arrays of patches may be connected to a plurality of ports, which can be connected to a multiport Wi-Fi access, using multiple-input and multiple-output ("MIMO") functionality, and in some cases using IEEE 802.11a/b/g/n/ac/ad/af standards.

Patch separation between adjacent patches in each array are typically half-lambda separation or $\lambda/2$ separation (where lambda or $\lambda$ might refer to the wavelength of the rf signal(s)). This allows for some intertwining between patches, particular, intertwining between patches of two or more different arrays of patches. In some embodiments feed lines to the multiple arrays can be separate, or may be combined for dual-/multi-mode devices.

Figure 5B:
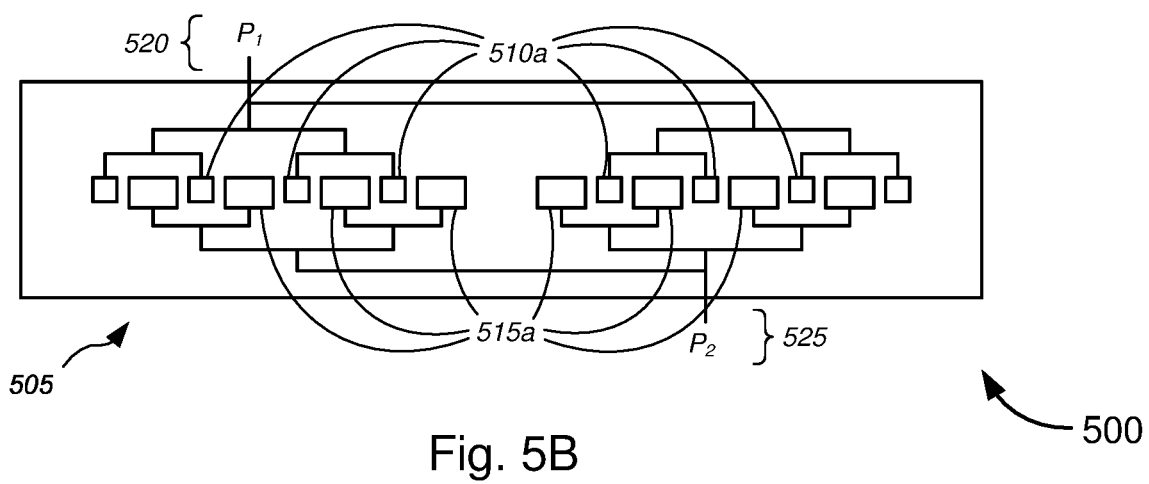

In the example of FIGS. 5A and 5B, the two arrays 510 and 515 each have its own, separate feed lines 510b and 515b, respectively, leading to separate ports $P_1$ and $P_2$, respectively. FIG. 5B shows a schematic diagram of an example of feed line configuration for the two arrays 510 and 515. In particular, in FIG. 5B, each of the lateral patches 510a of the first array 510 share a single feed line 510b that lead to port $P_1$ (or port 520). Likewise, each of the lateral patches 515a share a single feed line 515b that lead to port $P_2$ (or port 525). Feed lines 510b and 515b are separate from each other, as ports 520 and 525 are separate from each other.

Figure 5C:
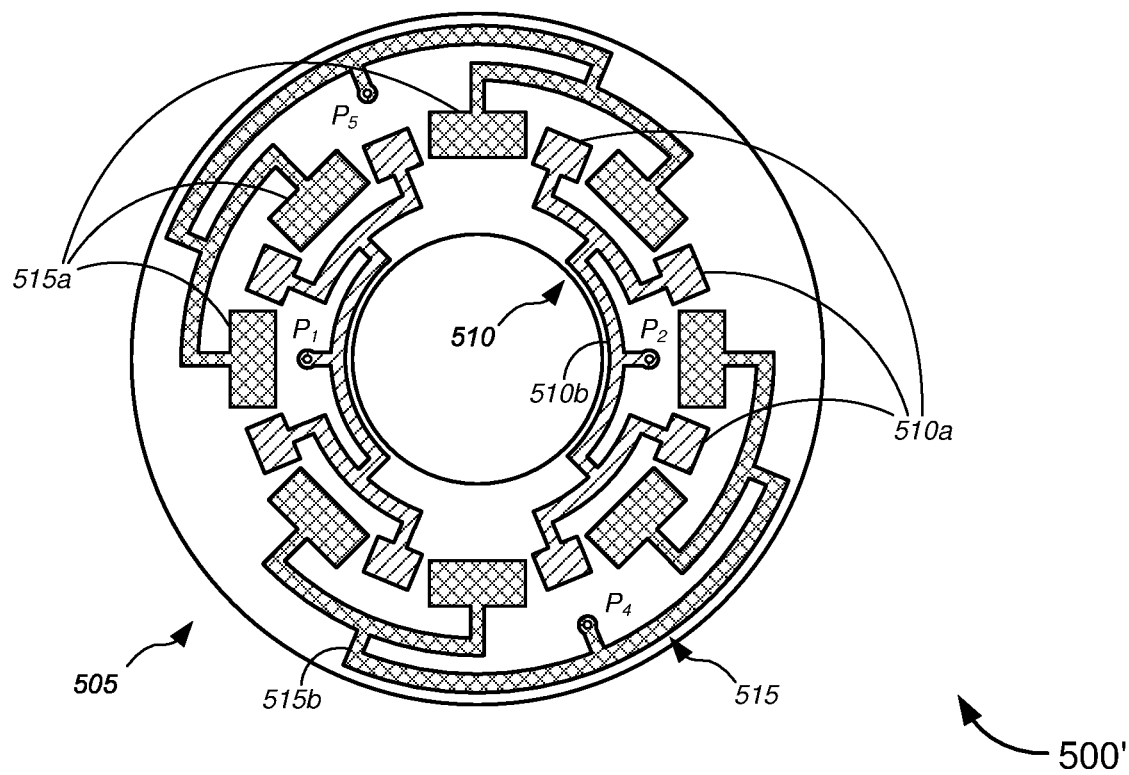
Figure 5D:
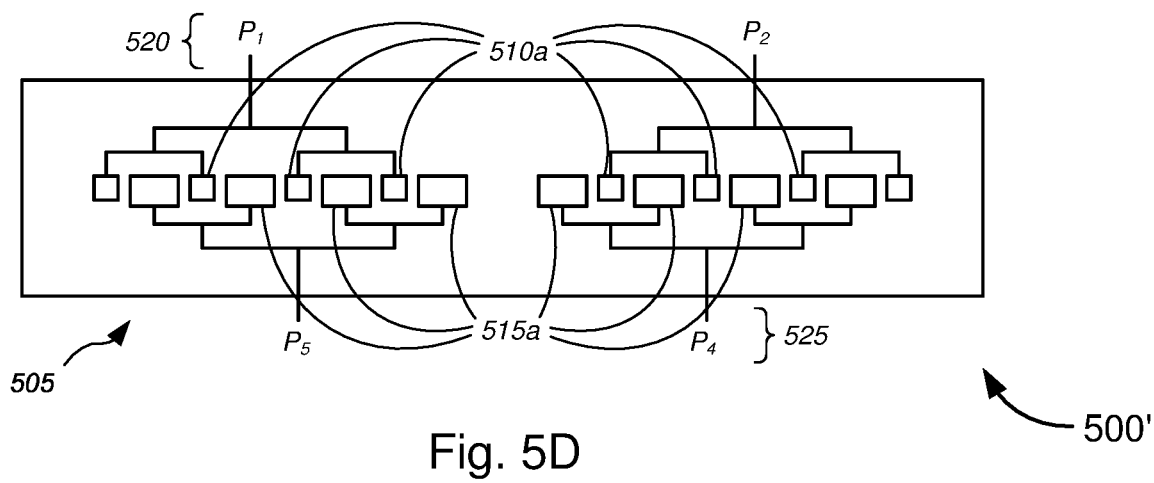

FIGS. 5C and 5D are similar to FIGS. 5A and 5B, respectively, except that the first array 510 or the second array 515 are each configured as two separate arrays (totaling four separate arrays in the embodiment of FIG. 5C). In particular, in FIG. 5C, the first array 510 comprises a third array and a fourth array. The third array might comprise x' number of lateral patch antennas 510a connected to a common microstrip 510b (in this case, x'=4), while the fourth array might comprise x" number of lateral patch antennas 510a connected to a common microstrip 510b (in this case, x"=4). Although the third array and fourth array are shown to have the same number of lateral patch antennas 510a (i.e., x'=x"), the various embodiments are not so limited and each array can have different numbers of lateral patch antennas 510a (i.e., can be x'≠x"). Similarly, although x' and x" are each shown to equal 4 in the example of FIG. 5C, any suitable number of lateral patch antennas may be used, as discussed above with respect to the number of lateral patch antennas for each array.

Similarly, the second array 515 comprises a fifth array and a sixth array. The fifth array might comprise y' number of lateral patch antennas 515a connected to a common microstrip 515b (in this case, y'=4), while the sixth array might comprise y" number of lateral patch antennas 515a connected to a common microstrip 515b (in this case, y"=4). Although the fifth array and sixth array are shown to have the same number of lateral patch antennas 515a (i.e., y'=y"), the various embodiments are not so limited and each array can have different numbers of lateral patch antennas 515a (i.e., can be y'≠y"). Similarly, although y' and y" are each shown to equal 4 the example of FIG. 5C, any suitable number of lateral patch antennas may be used, as discussed above with respect to the number of lateral patch antennas for each array.

Further, although only two sub-arrays are shown for each of the first array 510 and for the second array 515, any suitable number of sub-arrays may be utilized for each of the first array 510 and for the second array 515, and the number of sub-arrays need not be the same for the two arrays. In the case that antenna 505 comprises three or more arrays, any number of sub-arrays for each of the three or more arrays may be utilized, and the number of sub-arrays may be different for each of the three or more arrays.

Turning back to FIGS. 5C and 5D, each of the third, fourth, fifth, and sixth arrays are separately fed by separate microstrips 510b/515b, each communicatively coupled to separate ports, $P_1$-$P_4$, respectively. FIG. 5D shows a schematic diagram of an example of feed line configuration for each of the two sub-arrays for each of the two arrays 510 and 515. In particular, in FIG. 5D, each of the lateral patches 510a of the third array share a single feed line 510b that lead to port $P_1$, while each of the lateral patches 510a of the fourth array share a single feed line 510b that lead to port $P_2$. Ports $P_1$ and $P_2$ (i.e., ports 520) may subsequently be coupled together to communicatively couple, via cable distribution system 225 (and via container 205) of FIG. 2 of the '460 Application or via signal distribution system 110, 210, or 310 of FIGS. 1-3 above (which might be disposed in an aerial radiating closure, a below grade radiating closure, or a buried radiating closure), or the like, to one or more of the at least one optical fiber line, the at least one conductive signal line (including, but not limited to, copper data lines, copper video lines, copper voice lines, or any suitable (non-optical fiber) data cables, (non-optical fiber) video cables, or (non-optical fiber) voice cables, and/or the like), and/or the like. Alternatively, ports $P_1$ and $P_2$ (i.e., ports 520) may each separately communicatively couple, via cable distribution system 225 (and via container 205) of FIG. 2 of the '460 Application or via signal distribution system 110, 210, or 310 of FIGS. 1-3 above (which might be disposed in an aerial radiating closure, a below grade radiating closure, or a buried radiating closure), or the like, to one or more of the at least one optical fiber line, the at least one conductive signal line, and/or the like.

Likewise, each of the lateral patches 515a of the fifth array share a single feed line 515b that lead to port $P_3$ (or port 525), while each of the lateral patches 515a of the sixth array share a single feed line 515b that lead to port $P_4$. Ports $P_3$ and $P_4$ (i.e., ports 525) may jointly or separately be communicatively coupled, via cable distribution system 225 (and via container 205) of FIG. 2 of the '460 Application or via signal distribution system 110, 210, or 310 of FIGS. 1-3 above (which might be disposed in an aerial radiating closure, a below grade radiating closure, or a buried radiating closure), or the like, to one or more of the at least one optical fiber line, the at least one conductive signal line (including, but not limited to, copper data lines, copper video lines, copper voice lines, or any suitable (non-optical fiber) data cables, (non-optical fiber) video cables, or (non-optical fiber) voice cables, and/or the like), and/or the like. Feed lines 510b and 515b are separate from each other, as ports 520 and 525 are separate from each other.

The embodiment 500' of FIGS. 5C and 5D is otherwise similar, or identical to, the embodiment 500 of FIGS. 5A and 5B, respectively. As such, the descriptions of the embodiment 500 of FIGS. 5A and 5B similar apply to the embodiment 500' of FIGS. 5C and 5D, respectively.

Figure 5E:
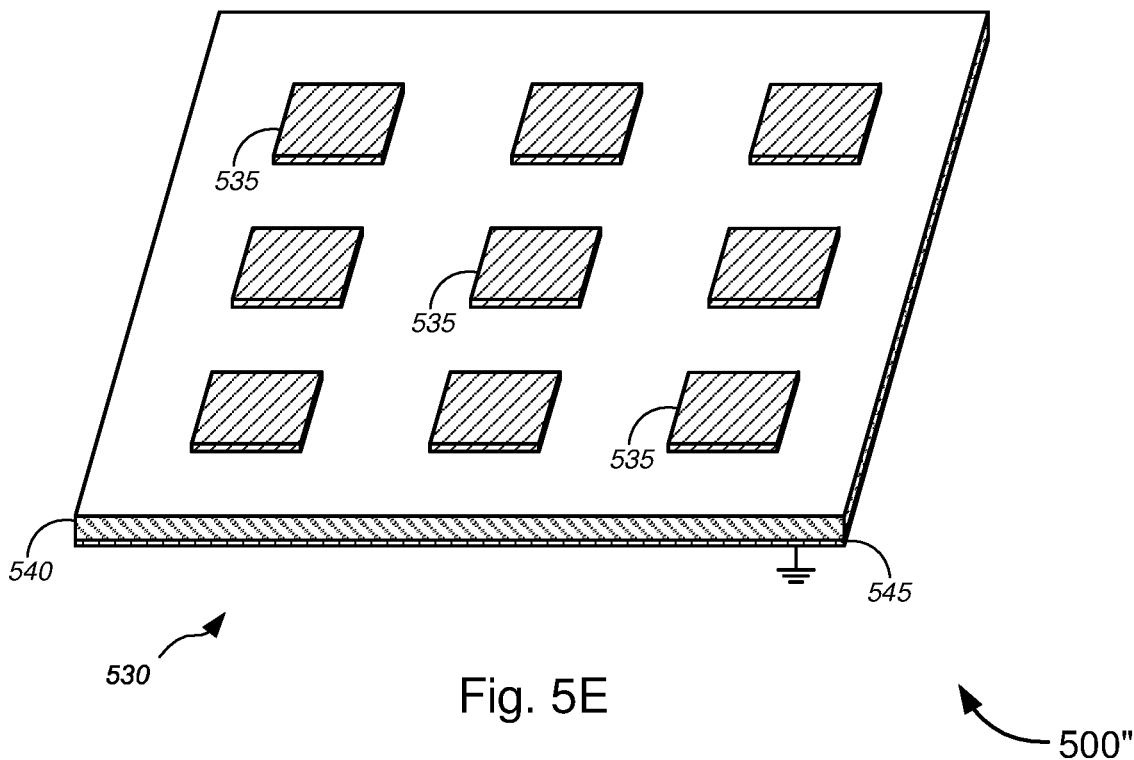
Figure 5F:
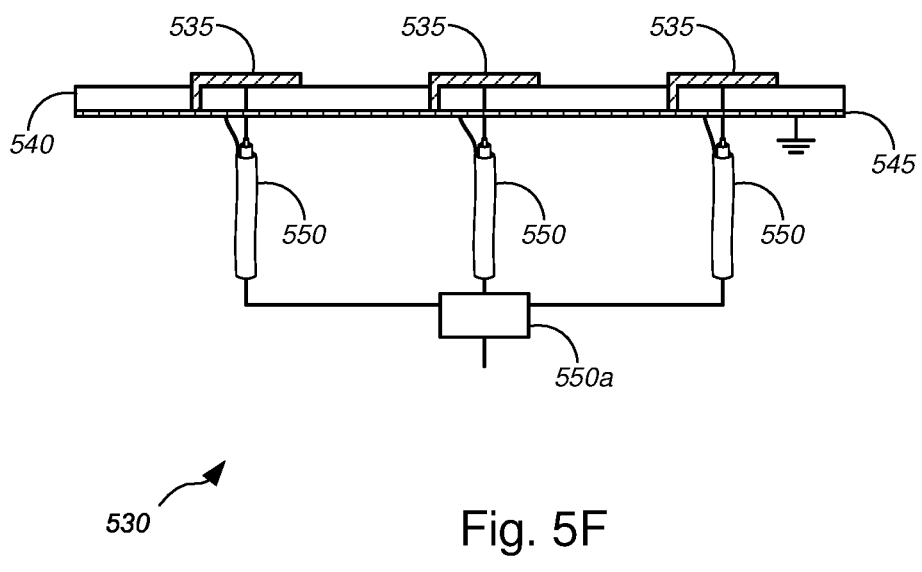

FIGS. 5E-5H show embodiments 500″ and 500‴ of leaky planar waveguide antennas 530 and 555. In FIG. 5E, antenna 530 comprises a plurality of patch antennas 535 disposed or fabricated on a thin dielectric substrate 540. Antenna 530 further comprises a ground plane 545. In some embodiments, each of the plurality of patch antennas 535 might comprise an L-patch antenna 535 (as shown in FIG. 5F), with a planar portion substantially parallel with the ground plane 545 and a grounding strip that extends through the dielectric substrate 540 to make electrical contact with the ground plane 545 (in some cases, the grounding strip is perpendicular with respect to each of the planar portion and the ground plane 545). According to some embodiments, each of the plurality of patch antennas 535 might comprise a planar patch antenna 535 (i.e., without a grounding strip connecting the planar portion with the ground plane 545). Dielectric substrate 540 is preferably made of any dielectric material, and is configured to have a dielectric constant (or relative permittivity) $\varepsilon_r$ that ranges between about 3 and 10.

FIG. 5F shows a plurality of L-patch antennas 535 each being electrically coupled to one of a plurality of cables 550. Although a plurality of cables 550 is shown, a single cable 550 with multiple leads connecting each of the plurality of L-patch antennas 535 may be used. The grounding lead for each of the plurality of cables 550 may be electrically coupled to the ground plane 545. In the case that a plurality of cables 550 are used, the signals received by each antenna 535 may be separately received and relayed to one of the at least one optical fiber line, the at least one conductive signal line, and/or the like, or the received signals may be combined and/or processed using a combiner 550a (which might include, without limitation, a signal processor, a multiplexer, signal combiner, and/or the like). For signal transmission, signals from the at least one conductive signal line, and/or the like may be separately relayed to each of the antennas 535 via individual cables 550, or the signals each of the at least one conductive signal line, and/or the like can be divided using a divider 550a (which might include, but is not limited to, a signal processor, a demultiplexer, a signal divider, and/or the like) prior to individual transmission by each of the antennas 535.

Figure 5G:
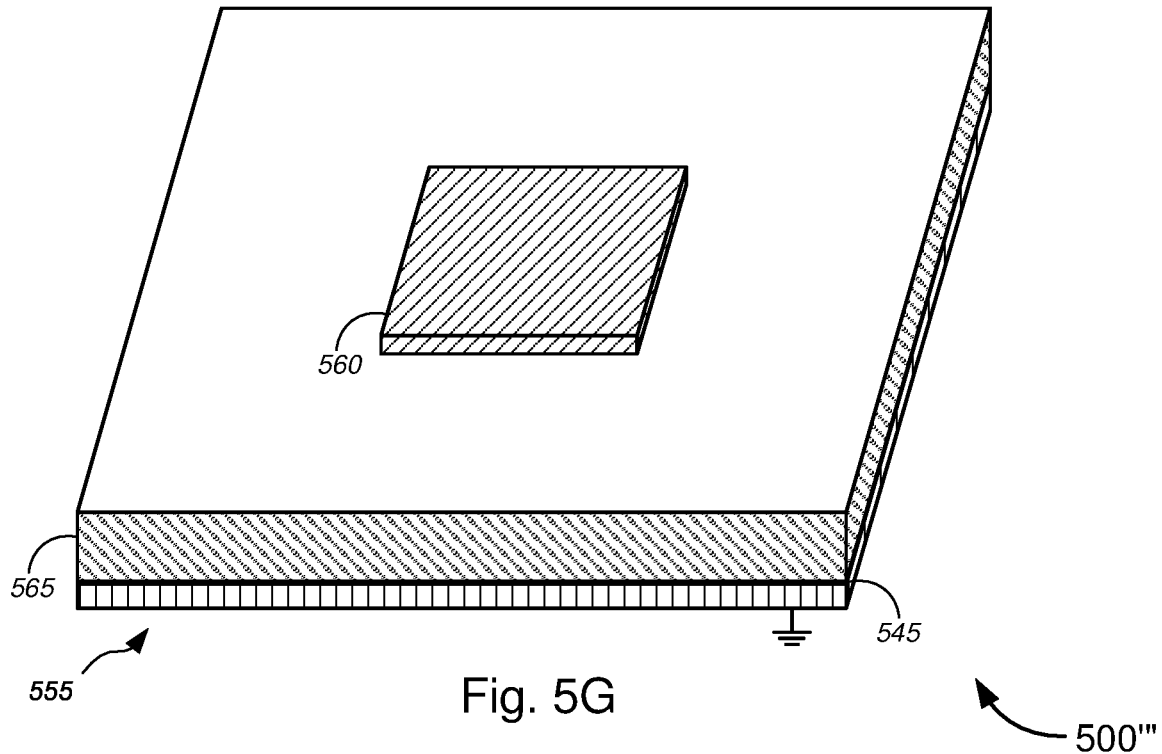
Figure 5H:
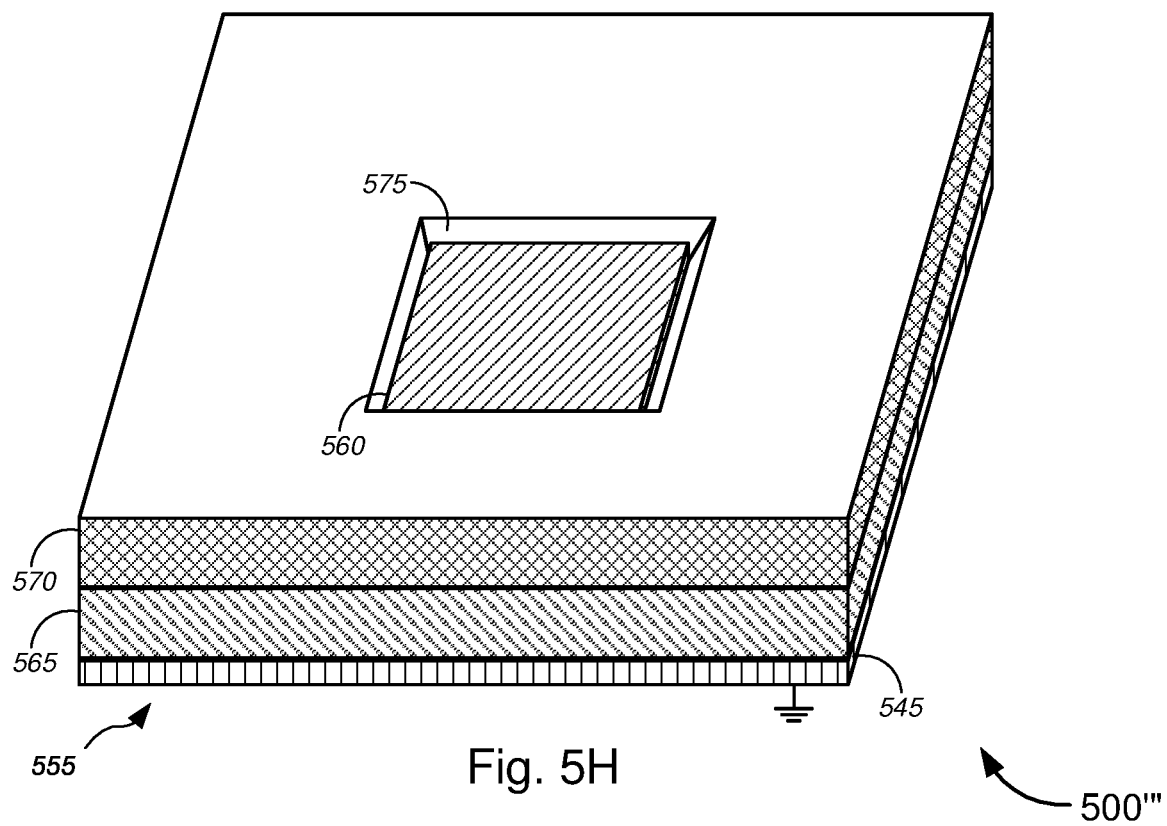

FIGS. 5G and 5H illustrate antennas without and with additional elements (including, without limitation, additional directing elements, a second dielectric layer, optional elements atop the second dielectric layer, and/or the like), respectively, that may be added to the planar structure to further direct antenna radiation patterns to predetermined angles (e.g., lower or higher elevation angles, or the like). In FIG. 5G, antenna 555 might comprise a patch antenna 560, which might include a planar patch antenna, an L-patch antenna, or the like. Antenna 555 might further comprise a dielectric substrate 565 on which patch antenna 560 might be disposed. Antenna 555 might further comprise a ground plane 545. Dielectric substrate 565 and ground plane 545, in some embodiments, might be similar, or identical to, dielectric substrate 540 and ground plane 545, respectively, described above with respect to FIGS. 5E and 5F, and thus the corresponding descriptions of dielectric substrate 540 and ground plane 545 above apply similarly to dielectric substrate 565 and ground plane 545. In some instances, the dimensions of each of dielectric substrate 565 and ground plane 545 of FIGS. 5G-5H might differ from the dimensions of each of dielectric substrate 540 and ground plane 545 of FIGS. 5E-5F, respectively. In still other cases, dielectric substrate 565 and dielectric substrate 540 might differ in terms of their corresponding dielectric material having different dielectric constant (or relative permittivity) $\varepsilon_r$ (although in some embodiments, the dielectric constant or relative permittivity $\varepsilon_r$ of each of dielectric substrate 565 ($\varepsilon_{r1}$) and dielectric substrate 540 ($\varepsilon_r$) might range between about 3 and 10).

In FIG. 5H, antenna 555 might further comprise additional elements 570, which might include, but are not limited to, additional directing elements, a second dielectric layer, optional elements atop the second dielectric layer, and/or the like. The additional elements 570 serve to further direct antenna radiation patterns to predetermined angles (e.g., lower or higher elevation angles, or the like). The additional elements 570 might comprise opening 575, which might be configured to have either a perpendicular inner wall or a tapered inner wall, in order to facilitate focusing of the radiation patterns. In some embodiments the dielectric constant or relative permittivity $\varepsilon_{r2}$ of additional elements 570 is chosen to be less than the dielectric constant or relative permittivity $\varepsilon_{r1}$ of dielectric substrate 565. With a lower dielectric constant or relative permittivity compared with that of the dielectric substrate 565 below it, the additional elements 570 might focus the radiation patterns or signals closer to the horizon.

FIGS. 5G and 5H show an antenna 555 including a single patch antenna 555, which could include a planar patch antenna, an L-patch antenna, or the like. In some instances, the single antenna 555 might be part of a larger array of antennas, while, in other cases, the single antenna 555 might be a stand-alone antenna. For the purposes of illustration, only a single antenna is shown in FIGS. 5G and 5H to simplify the description thereof.

FIGS. 5I-5K show embodiments 500″″ of reversed F antennas or planar inverted F antennas ("PIFA"), which are typically used for wide, yet directed antenna radiation patterns. As shown in FIG. 5I, a plurality of PIFA elements 590 can be placed around the top (i.e., an annulus or crown) of a pedestal or other signal distribution device, thus achieving a good omnidirectional coverage around the signal distribution device, focused at low elevation (i.e., horizon bore sight). The signal distribution device might include, but is not limited to, one or more hand holes 115, one or more flowerpot hand holes 120, one or more pedestal platforms 125, one or more network access point ("NAP") platforms 130 (which might be buried, as shown and described with respect to FIG. 4 of the '460 Application), one or more fiber distribution hub ("FDH") platforms 135 of FIG. 1 of the '665 Application (which has already been incorporated herein by reference in its entirety for all purposes), and/or the like. Alternatively, the signal distribution device might include, without limitation signal distribution system 110, 210, or 310 of FIGS. 1-3 above (which might be disposed in an aerial radiating closure, a below grade radiating closure, or a buried radiating closure), or the like. According to some embodiments, some PIFA elements can be placed inside pedestal plastic structures.

In the embodiment shown in FIG. 5I, in particular, antenna 580 might comprise a plurality of PIFA elements 590 disposed on base portion 585. In this embodiment, 4 PIFA elements 590 are shown disposed at different corners of a square base portion 585, which might be disposed on/in a top portion (e.g., upper portion 235a), annulus (e.g., annular ring mount 235a″), crown, or lid (e.g., lid 215) of a pedestal (e.g., pedestal 125), though the various embodiments may include any suitable number of PIFA elements 590. For example, 2 or 4 more PIFA elements might be placed on each side of the base portion 585.

As shown in FIGS. 5I-5K, each PIFA element 590 might comprise an antenna portion 590a, a shorting pin 590b, a feed point 590*c*, and a ground plane 545. In some embodiments, the antenna portion 590*a* might be a rectangular segment having length, width, and area dimensions configured to transmit and receive rf signals having particular frequencies. The shorting pin 590*b* might be one of a rectangular segment having a width that is the same as the width of the antenna portion 590*a*, a rectangular segment having a width smaller than the width of the antenna portion 590*a*, or a wire connection, and the like. The feed point 590*c* might, in some instances, include one of a pin structure, a block structure, a wire connection, and/or the like. The feed point 590*c* might communicatively couple to cable 550, which might communicatively couple to one of the at least one optical fiber line, the at least one conductive signal line, and/or the like. Like in the embodiment of FIG. 5F, the grounding lead for each cable 550 may be electrically coupled to the ground plane 545. In some cases, the ground plane 545 might be circular (as shown, e.g., in FIGS. 5I and 5K), rectangular, square, or some other suitable shape.

In some embodiments, several PIFA elements 590 may be combined in a similar manner as described above with respect to the combiner/divider 550*a* (in FIG. 5F). Alternatively, some or all of the PIFA elements 590 may be left independent for a MIMO antenna array (as also described above). According to some embodiments, some PIFA elements might further comprise dielectric substrates, not unlike the dielectric substrates described above with respect to FIGS. 5E-5H.

Although the above embodiments in FIGS. 5A-5K refer to customized transceiver or radio elements, some embodiments might utilize commercial grade radio equipment with built-in smart antennas. Many Wi-Fi radio manufacturers are improving antennas to include arrays that are well-suited for adapting to difficult propagation environments, such as ones created by a low pedestal or hand hole with obstructing buildings around. Placing such commercial devices with good smart antenna capabilities in the top (i.e., dome, cover, or lid) of the pedestal (or in the lid of hand holes) may achieve sufficient results in limited reach scenarios.

Further, although the various antenna types described above are described as stand-alone or independent antenna options, the various embodiments are not so limited, and the various antenna types may be combined into a single or group of sets of antennas. For example, the planar waveguide antennas of FIGS. 5E-5H may be combined with lateral microstrip patch arrays of FIGS. 5A-5D and/or with the lateral PIFA arrays of FIGS. 5I-5K, due to their different (and sometimes complementary) main orientations. Lateral arrays can, for instance, provide good access to nearby homes, whereas top leaky waveguide antennas can add access to a higher location (including, but not limited to, multi-story multi-dwelling units, or the like), or can provide backhaul to a nearby utility pole or structure with another access point, and/or the like.

In some embodiments, antenna 505, 530, 555, or 580 may be disposed within wireless access point device 1105 of FIGS. 11D and 11E, may be disposed within tray 1205*b* of wireless access point device 1205 of FIG. 12, may be disposed within tray 1305*b* or 1305*b*' of the wireless access point device 1300 of FIGS. 13A-13H, or may be disposed within capping module or dome 1350 or 1350' of the wireless access point device 1300' of FIGS. 13I-13P of the '460 Application. Alternatively, antenna 505, 530, 555, or 580 may be disposed within a radiating closure (e.g., radiating closures 105, 205*a*-205*d*, and 305*a*-305*d* of FIGS. 1-3, or the like) or embedded within a housing or housing material of the radiating closure, which might be one of an aerial radiating closure, a below grade radiating closure, or a buried radiating closure, as described in detail above with respect to FIGS. 1-3.

Figure 6A:
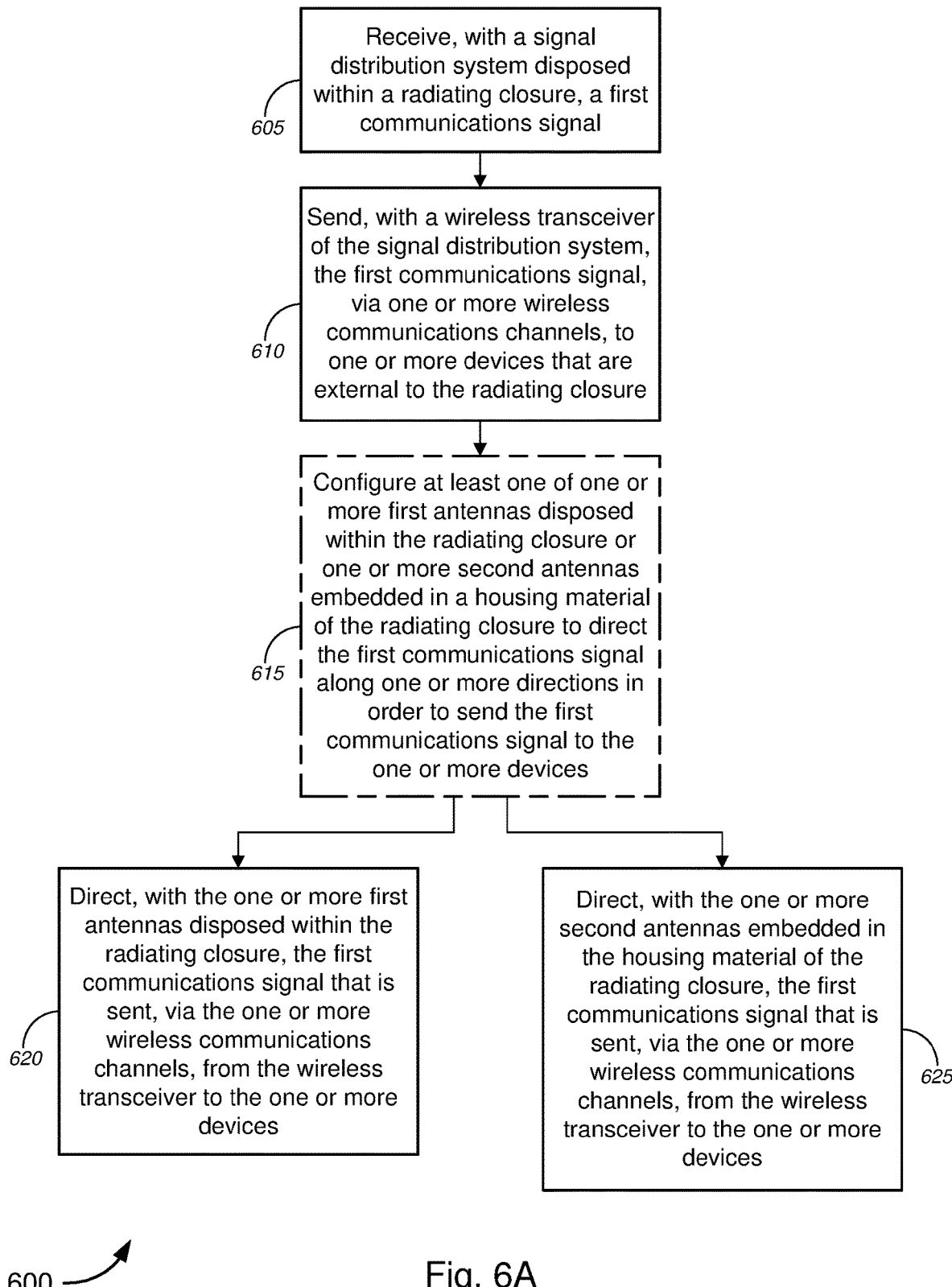
FIGS. 6A and 6B are flow diagrams illustrating a method for implementing telecommunications signal relays, in accordance with various embodiments.
Figure 6B:
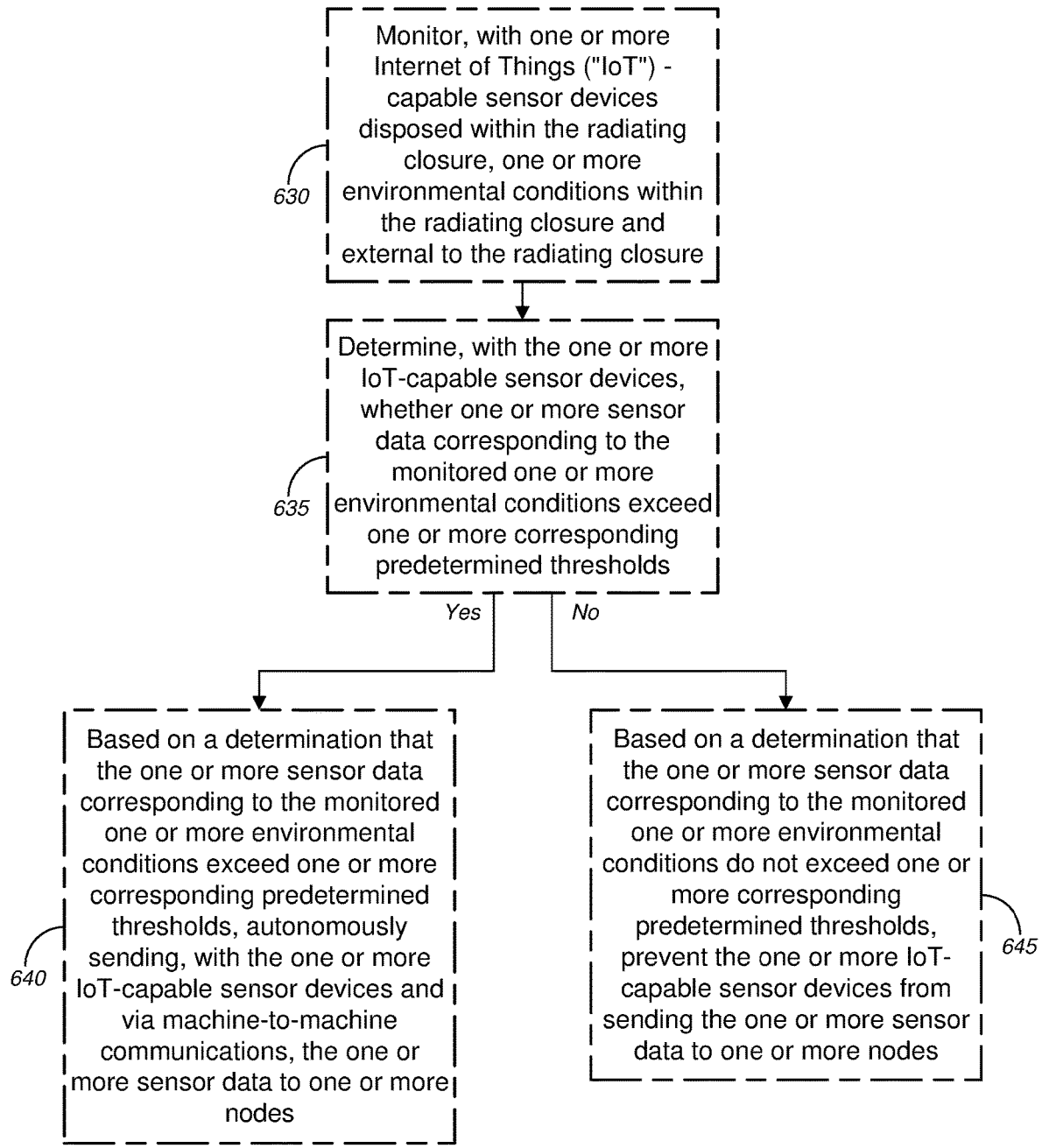

FIGS. 6A and 6B (collectively, "FIG. 6") are flow diagrams illustrating a method 600 for implementing telecommunications signal relays, in accordance with various embodiments.

While the techniques and procedures are depicted and/or described in a certain order for purposes of illustration, it should be appreciated that certain procedures may be reordered and/or omitted within the scope of various embodiments. Moreover, while the method 600 illustrated by FIG. 6 can be implemented by or with (and, in some cases, are described below with respect to) the systems, apparatuses, or embodiments 100, 200-200''', 300-300''', 400-400''', and 500-500''' '' of FIGS. 1, 2, 3, 4, and 5, respectively (or components thereof), such methods may also be implemented using any suitable hardware (or software) implementation. Similarly, while each of the systems, apparatuses, or embodiments 100, 200-200''', 300-300''', 400-400''', and 500-500''' '' of FIGS. 1, 2, 3, 4, and 5, respectively (or components thereof), can operate according to the method 600 illustrated by FIG. 6 (e.g., by executing instructions embodied on a computer readable medium), the systems, apparatuses, or embodiments 100, 200-200''', 300-300''', 400-400''', and 500-500''' '' of FIGS. 1, 2, 3, 4, and 5 can each also operate according to other modes of operation and/or perform other suitable procedures.

In the non-limiting embodiment of FIG. 6A, method 600, at block 605, might comprise receiving, with a signal distribution system disposed within a radiating closure, a first communications signal. In some cases, receiving the first communications signal might comprise receiving, with the signal distribution system, the first communications signal via one or more signal lines entering the radiating closure through one or more pass-throughs in at least one wall of the radiating closure. The one or more signal lines, in some instances, might include, without limitation, at least one of one or more telecommunications lines, one or more broadband-over-power signal lines, one or more copper cable lines, one or more optical fiber lines, or one or more coaxial cable lines, and/or the like. According to some embodiments, the radiating closure might form a container or might form a lid of a container. In some embodiments, the radiating closure might be one of an aerial radiating closure, a below grade radiating closure, or a buried radiating closure, and/or the like.

At block 610, method 600 might comprise sending, with a wireless transceiver of the signal distribution system, the first communications signal, via one or more wireless communications channels, to one or more devices that are external to the radiating closure. Method 600 might further comprise, at optional block 615, configuring, with the signal distribution system (in some cases, at least one processor of the signal distribution system, as shown and described above with respect to FIGS. 2C, 2D, 3C, and 3D, or the like) at least one of one or more first antennas disposed within the radiating closure or one or more second antennas embedded in a housing material of the radiating closure to direct the first communications signal along one or more directions in order to send the first communications signal to the one or more devices, particularly for active antenna elements or configurable antenna arrays, and/or the like.

In some embodiments, method 600 might further comprise directing, with the one or more first antennas disposed within the radiating closure, the first communications signal that is sent, via the one or more wireless communications channels, from the wireless transceiver to the one or more devices (block 620) or directing, with the one or more second antennas embedded in the housing material of the radiating closure, the first communications signal that is sent, via the one or more wireless communications channels, from the wireless transceiver to the one or more devices (block 625), or both. In some cases, directing the first communications signal might comprise directing the first communications signal in multiple different directions concurrently or simultaneously (either two or more discretely different directions or in all directions (i.e., radiating radially outward in three-dimensions, similar, but not limited, to radiating from a sphere or radiating from some other three-dimensional object, or the like)).

According to embodiments, the one or more first antennas and the one or more second antennas might each transmit and receive wireless broadband signals according to a set of protocols comprising at least one of IEEE 802.11a, IEEE 802.11b, IEEE 802.11g, IEEE 802.11n, IEEE 802.11ac, IEEE 802.11ad, or IEEE 802.1af, and/or the like. Alternatively, or additionally, the one or more first antennas and the one or more second antennas might each transmit and receive wireless broadband signals according to a set of protocols comprising at least one of Universal Mobile Telecommunications System ("UMTS"), Code Division Multiple Access ("CDMA"), Time Division Multiple Access ("TDMA"), Global System for Mobile Communication ("GSM"), Long Term Evolution ("LTE"), Personal Communications Service ("PCS"), Advanced Wireless Services ("AWS"), Emergency Alert System ("EAS"), Citizens Band Radio Service ("CBRS"), or Broadband Radio Service ("BRS"), and/or the like. In some cases, the one or more first antennas might each include, without limitation, at least one of a plurality of lateral patch antennas, a plurality of arrays of patch antennas, one or more micro-strip patch antennas, a two-dimensional ("2D") leaky waveguide antenna, or a three-dimensional ("3D") array of antenna elements, and/or the like. In some instances, one or more of the at least one of the plurality of lateral patch antennas, the plurality of arrays of patch antennas, the one or more micro-strip patch antennas, the two-dimensional ("2D") leaky waveguide antenna, or the three-dimensional ("3D") array of antenna elements, and/or the like might comprise flexible material that allows the one or more of the at least one of the plurality of lateral patch antennas, the plurality of arrays of patch antennas, the one or more micro-strip patch antennas, the two-dimensional ("2D") leaky waveguide antenna, or the three-dimensional ("3D") array of antenna elements, and/or the like to be bent (as shown and described above with respect to FIG. 4B or the like) while being disposed within the radiating closure. Alternatively or additionally, at least one of the one or more first antennas and the one or more second antennas might comprise at least one active antenna element or the like. In some cases, the housing material of the radiating closure might comprise at least one of metal or plastic, and/or the like.

In some embodiments, the radiating closure might have disposed therein one or more IoT sensor devices, as shown and described above with respect to FIGS. 2A, 2C, 3A, and 3C. With reference to FIG. 6B, method 600 might further comprise, at optional block 630, monitoring, with the one or more IoT sensor devices disposed within the radiating closure, one or more environmental conditions within the radiating closure and external to the radiating closure. In some instances, the one or more environmental conditions being monitored might include, but are not limited to, at least one of temperature, humidity, movement, vibration, presence of particular chemicals, pressure (both atmospheric and physical), weather, wind conditions, moisture, or seismic activity, and/or the like, using corresponding one or more of the following sensors: at least one of one or more temperature sensors, one or more humidity sensors, one or more accelerometers, one or more vibration sensors, one or more chemical detectors, one or more pressure sensors, one or more weather sensors, one or more wind sensors, one or more moisture sensors, or one or more seismic sensors, and/or the like. At optional block 635, the method 600 might comprise determining, with the one or more IoT-capable sensor devices, whether one or more sensor data corresponding to the monitored one or more environmental conditions exceed one or more corresponding predetermined thresholds. Method 600 might further comprise, based on a determination that the one or more sensor data corresponding to the monitored one or more environmental conditions exceed one or more corresponding predetermined thresholds, autonomously sending, with the one or more IoT-capable sensor devices and via machine-to-machine communications, the one or more sensor data to one or more nodes (at optional block 640) or, based on a determination that the one or more sensor data corresponding to the monitored one or more environmental conditions do not exceed the one or more corresponding predetermined thresholds, preventing the one or more IoT-capable sensor devices from sending the one or more sensor data to the one or more nodes. According to some embodiments (as shown and described above with respect to FIG. 1), the one or more IoT-capable sensor devices might alternatively or additionally autonomously send, via machine-to-machine communications, the one or more sensor data to at least one of the one or more devices.

Exemplary System and Hardware Implementation

Figure 7:
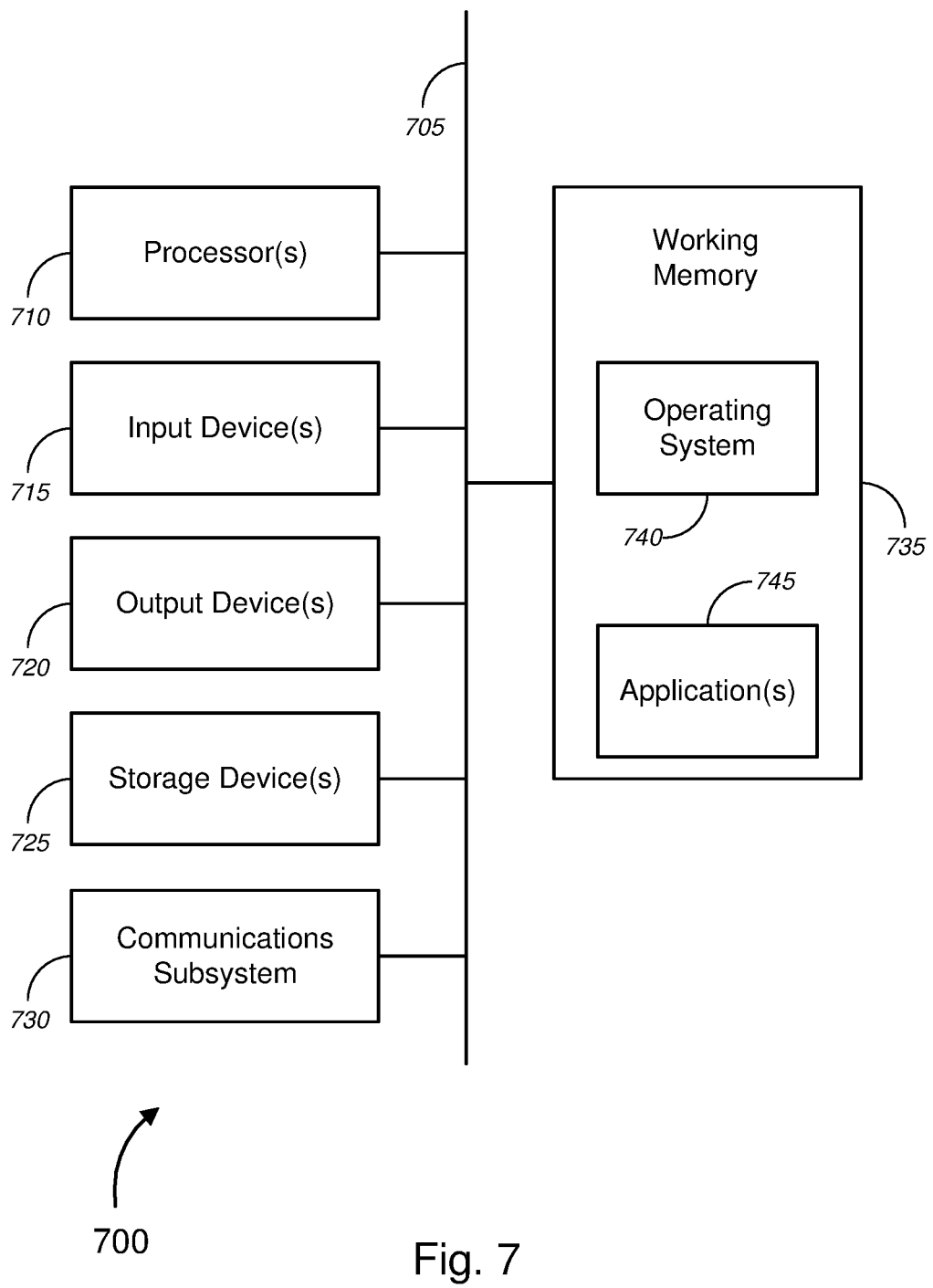
FIG. 7 is a block diagram illustrating an exemplary computer or system hardware architecture, in accordance with various embodiments.

FIG. 7 is a block diagram illustrating an exemplary computer or system hardware architecture, in accordance with various embodiments. FIG. 7 provides a schematic illustration of one embodiment of a computer system 700 of the service provider system hardware that can perform the methods provided by various other embodiments, as described herein, and/or can perform the functions of computer or hardware system (i.e., signal distribution systems 110, 210*a*, 210*b*, 310*a*, and 310*b*, Internet of Things ("IoT") sensor devices 125, 225, and 325, servers 140, devices 160*a*-160*n* and 170*a*-170*n*, and wireless distribution devices 175*a*-175*n*, etc.), as described above. It should be noted that FIG. 7 is meant only to provide a generalized illustration of various components, of which one or more (or none) of each may be utilized as appropriate. FIG. 7, therefore, broadly illustrates how individual system elements may be implemented in a relatively separated or relatively more integrated manner.

The computer or hardware system 700—which might represent an embodiment of the computer or hardware system (i.e., signal distribution systems 110, 210*a*, 210*b*, 310*a*, and 310*b*, IoT sensor devices 125, 225, and 325, servers 140, devices 160*a*-160*n* and 170*a*-170*n*, and wireless distribution devices 175*a*-175*n*, etc.), described above with respect to FIGS. 1-6—is shown comprising hardware elements that can be electrically coupled via a bus 705 (or may otherwise be in communication, as appropriate). The hardware elements may include one or more processors 710, including, without limitation, one or more general-purpose processors and/or one or more special-purpose processors (such as microprocessors, digital signal processing chips, graphics acceleration processors, and/or the like); one or more input devices 715, which can include, without limitation, a mouse, a keyboard and/or the like; and one or more output devices 720, which can include, without limitation, a display device, a printer, and/or the like.

The computer or hardware system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computer or hardware system 700 might also include a communications subsystem 730, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 730 may permit data to be exchanged with a network (such as the network described below, to name one example), with other computer or hardware systems, and/or with any other devices described herein. In many embodiments, the computer or hardware system 700 will further comprise a working memory 735, which can include a RAM or ROM device, as described above.

The computer or hardware system 700 also may comprise software elements, shown as being currently located within the working memory 735, including an operating system 740, device drivers, executable libraries, and/or other code, such as one or more application programs 745, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 700 and/or might take the form of source and/or installable code, which, upon compilation and/or installation on the computer or hardware system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 700) to perform methods in accordance with various embodiments of the invention. According to a set of embodiments, some or all of the procedures of such methods are performed by the computer or hardware system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 700, various computer readable media might be involved in providing instructions/code to processor(s) 710 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 725. Volatile media includes, without limitation, dynamic memory, such as the working memory 735. In some alternative embodiments, a computer readable medium may take the form of transmission media, which includes, without limitation, coaxial cables, copper wire and fiber optics, including the wires that comprise the bus 705, as well as the various components of the communication subsystem 730 (and/or the media by which the communications subsystem 730 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 700. These signals, which might be in the form of electromagnetic signals, acoustic signals, optical signals, and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

Figure 8:
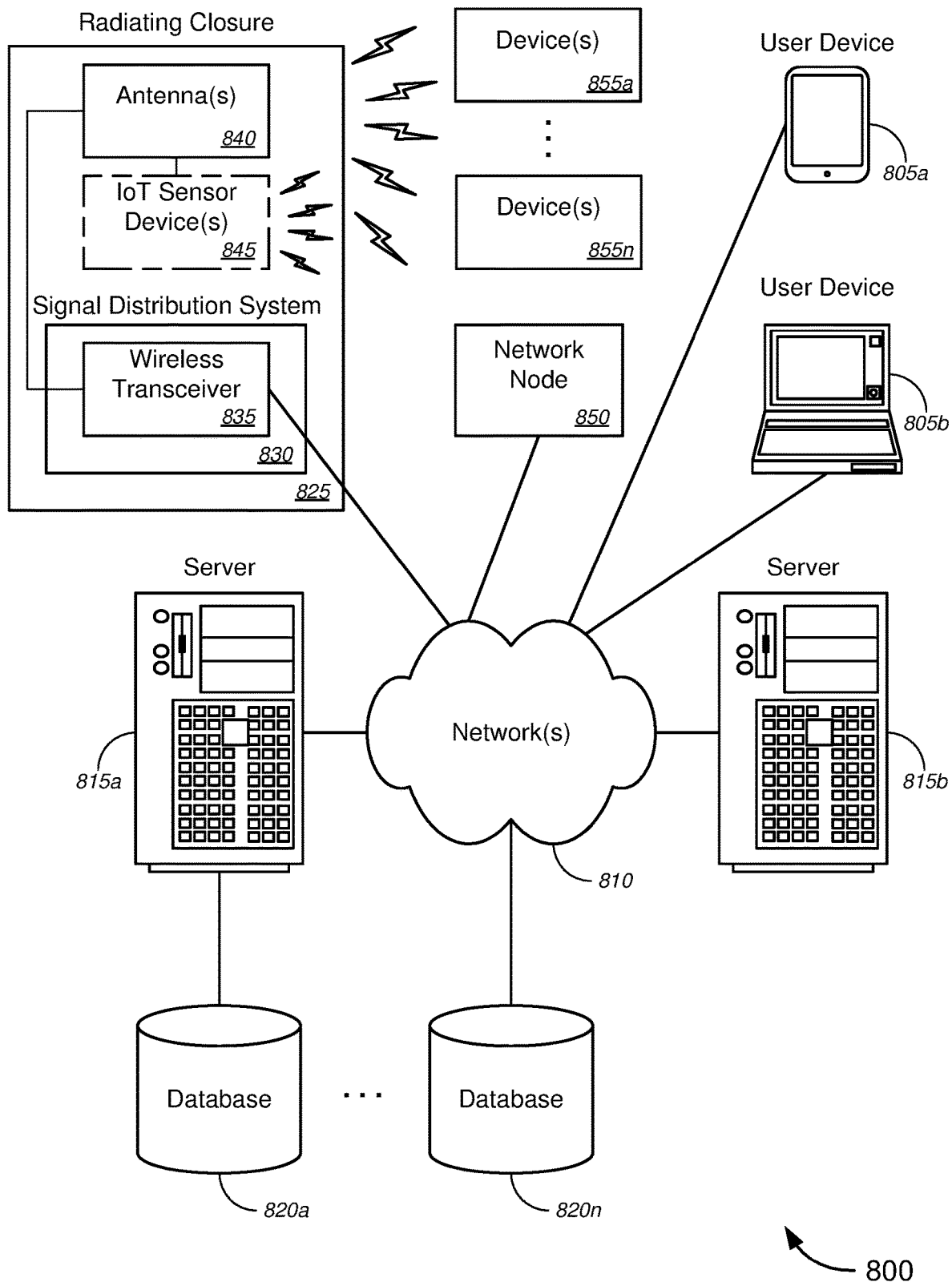
FIG. 8 is a block diagram illustrating a networked system of computers, computing systems, or system hardware architecture, which can be used in accordance with various embodiments.

As noted above, a set of embodiments comprises methods and systems for implementing telecommunications signal relays, and, more particularly, to methods, systems, and apparatuses for implementing telecommunications signal relays using radiating closures that are at least one of aerial radiating closures, below grade radiating closures, and/or buried radiating closures. FIG. 8 illustrates a schematic diagram of a system 800 that can be used in accordance with one set of embodiments. The system 800 can include one or more user computers, user devices, or customer devices 805. A user computer, user device, or customer device 805 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 805 can also have any of a variety of applications, including one or more applications configured to perform methods provided by various embodiments (as described above, for example), as well as one or more office applications, database client and/or server applications, and/or web browser applications. Alternatively, a user computer, user device, or customer device 805 can be any other electronic device, such as a thin-client computer, Internet-enabled mobile telephone, and/or personal digital assistant, capable of communicating via a network (e.g., the network(s) 810 described below) and/or of displaying and navigating web pages or other types of electronic documents. Although the exemplary system 800 is shown with two user computers, user devices, or customer devices 805, any number of user computers, user devices, or customer devices can be supported.

Certain embodiments operate in a networked environment, which can include a network(s) 810. The network(s) 810 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 810 (similar to network(s) 150 FIG. 1, or the like) can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 815. Each of the server computers 815 may be configured with an operating system, including, without limitation, any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 might be a data server, a web server, a cloud computing device(s), or the like, as described above. The data server might include (or be in communication with) a web server, which can be used, merely by way of example, to process requests for web pages or other electronic documents from user computers 805. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 805 to perform methods of the invention.

The server computers 815, in some embodiments, might include one or more application servers, which can be configured with one or more applications accessible by a client running on one or more of the client computers 805 and/or other servers 815. Merely by way of example, the server(s) 815 can be one or more general purpose computers capable of executing programs or scripts in response to the user computers 805 and/or other servers 815, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 805 and/or another server 815. In some embodiments, an application server can perform one or more of the processes for implementing telecommunications signal relays, and, more particularly, to methods, systems, and apparatuses for implementing telecommunications signal relays using radiating closures that are at least one of aerial radiating closures, below grade radiating closures, and/or buried radiating closures, or the like, as described in detail above. Data provided by an application server may be formatted as one or more web pages (comprising HTML, JavaScript, etc., for example) and/or may be forwarded to a user computer 805 via a web server (as described above, for example). Similarly, a web server might receive web page requests and/or input data from a user computer 805 and/or forward the web page requests and/or input data to an application server. In some cases, a web server may be integrated with an application server.

In accordance with further embodiments, one or more servers 815 can function as a file server and/or can include one or more of the files (e.g., application code, data files, etc.) necessary to implement various disclosed methods, incorporated by an application running on a user computer 805 and/or another server 815. Alternatively, as those skilled in the art will appreciate, a file server can include all necessary files, allowing such an application to be invoked remotely by a user computer, user device, or customer device 805 and/or server 815.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 820*a*-820*n* (collectively, "databases 820"). The location of each of the databases 820 is discretionary: merely by way of example, a database 820*a* might reside on a storage medium local to (and/or resident in) a server 815*a* (and/or a user computer, user device, or customer device 805). Alternatively, a database 820*n* can be remote from any or all of the computers 805, 815, so long as it can be in communication (e.g., via the network 810) with one or more of these. In a particular set of embodiments, a database 820 can reside in a storage-area network ("SAN") familiar to those skilled in the art. (Likewise, any necessary files for performing the functions attributed to the computers 805, 815 can be stored locally on the respective computer and/or remotely, as appropriate.) In one set of embodiments, the database 820 can be a relational database, such as an Oracle database, that is adapted to store, update, and retrieve data in response to SQL-formatted commands. The database might be controlled and/or maintained by a database server, as described above, for example.

According to some embodiments, system 800 might further comprise a radiating closure 825 (similar to radiating closures 105, 205*a*-205*d*, and 305*a*-305*d* of FIGS. 1-3, or the like), a signal distribution system 830 (similar to signal distribution systems 110, 210*a*, 210*b*, 310*a*, and 310*b* of FIG. 1-3, or the like), a wireless transceiver 835 (similar to wireless transceivers 115, 215, and 315 of FIGS. 1-3, or the like), an antenna(s) 840 (similar to antennas 120, 220, 320, 405, 415, 505, 530, 555, and 580 of FIGS. 1-5, or the like), an Internet of Things ("IoT") sensor device(s) 845 (optional; similar to IoT sensor devices 125, 225, and 325 of FIGS. 1-3, or the like), a network node 850 (similar to service node or base 135*b* of FIG. 1, or the like), and one or more devices 855*a*-855*n* (collectively, "devices 855" or the like; similar to devices 160*a*-160*n* and 170*a*-170*n* of FIG. 1 or the like). In some embodiments, the signal distribution system 830, which might comprise the wireless transceiver 835, might be disposed within the radiating closure 825. Also disposed within the radiating closure 825 might be the antenna(s) 840, and, according to some embodiments, one or more IoT sensor devices 845. According to some embodiments, the radiating closure might be one of an aerial radiating closure, a below grade radiating closure, or a buried radiating closure, and/or the like.

Merely by way of example, in some aspects, the antenna(s) 840 might include, without limitation, at least one of a plurality of lateral patch antennas, a plurality of arrays of patch antennas, one or more micro-strip patch antennas, a two-dimensional ("2D") leaky waveguide antenna, or a three-dimensional ("3D") array of antenna elements, and/or the like. In some instances, one or more of the at least one of the plurality of lateral patch antennas, the plurality of arrays of patch antennas, the one or more micro-strip patch antennas, the two-dimensional ("2D") leaky waveguide antenna, or the three-dimensional ("3D") array of antenna elements comprise flexible material that allows the one or more of the at least one of the plurality of lateral patch antennas, the plurality of arrays of patch antennas, the one or more micro-strip patch antennas, the two-dimensional ("2D") leaky waveguide antenna, or the three-dimensional ("3D") array of antenna elements to be bent while being disposed within a housing of the radiating closure 825. In some cases, at least one of the antenna(s) 840 might include at least one active antenna element.

In operation, according to some embodiments, the signal distribution system 830, which might be disposed within the radiating closure 825, might receive a first communications signal. In some cases, receiving the first communications signal might comprise receiving, with the signal distribution system, the first communications signal via one or more signal lines entering the radiating closure through one or more pass-throughs in at least one wall of the radiating closure. The one or more signal lines, in some instances, might include, without limitation, at least one of one or more telecommunications lines, one or more broadband-over-power signal lines, one or more copper cable lines, one or more optical fiber lines, or one or more coaxial cable lines, and/or the like. The wireless transceiver 835 of the signal distribution system 830 might send the first communications signal, via one or more wireless communications channels, to one or more devices 855*a*-855*n* that are external to the radiating closure 825 (and, in some cases, user devices 805*a* and/or 805*b*, as well). In some embodiments, the antenna(s) 840—which might comprise at least one of one or more first antennas disposed within the radiating closure (as shown and described above with respect to FIG. 2) or one or more second antennas embedded in a housing material of the radiating closure (as shown and described above with respect to FIG. 3), or a combination of the two—might direct the first communications signal that is sent, via the one or more wireless communications channels, from the wireless transceiver 835 to the one or more devices 855 (and/or user devices 805*a* and/or 805*b*), in some cases, directing the first communications signal in multiple different directions (either two or more discretely different directions or in all directions (i.e., radiating radially outward in three-dimensions, similar, but not limited, to radiating from a sphere or radiating from some other three-dimensional object, or the like)).

In some embodiments, the radiating closure 825 might have disposed therein one or more IoT sensor devices, which might monitor one or more environmental conditions within the radiating closure and external to the radiating closure. The one or more environmental conditions being monitored might include, but are not limited to, at least one of temperature, humidity, movement, vibration, presence of particular chemicals, pressure (both atmospheric and physical), weather, wind conditions, moisture, or seismic activity, and/or the like, using corresponding one or more of the following sensors: at least one of one or more temperature sensors, one or more humidity sensors, one or more accelerometers, one or more vibration sensors, one or more chemical detectors, one or more pressure sensors, one or more weather sensors, one or more wind sensors, one or more moisture sensors, or one or more seismic sensors, and/or the like. The one or more IoT-capable sensor devices 845 might, in some cases, determine whether one or more sensor data corresponding to the monitored one or more environmental conditions exceed one or more corresponding predetermined thresholds. If so, the one or more IoT-capable sensor devices might autonomously send, via machine-to-machine communications, the one or more sensor data to one or more network nodes 850. According to some embodiments, the one or more IoT-capable sensor devices might alternatively or additionally autonomously send, via machine-to-machine communications, the one or more sensor data to at least one of the one or more devices 855*a*-855*n* and/or user devices 805*a* and/or 805*b*.

These and other functions of the system 800 (and its components) are described in greater detail above with respect to FIGS. 1-6.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:
1. A method, comprising:
receiving, with a signal distribution system disposed within a radiating closure, a first communications signal;
sending, with a wireless transceiver of the signal distribution system, the first communications signal, via one or more wireless communications channels, to one or more devices that are external to the radiating closure;
directing, with at least one of one or more first antennas disposed within the radiating closure or one or more second antennas embedded in a housing material of the radiating closure, the first communications signal that is sent, via the one or more wireless communications channels, from the wireless transceiver to the one or more devices;
monitoring, with one or more Internet of Things ("IoT") -capable sensor devices disposed within the radiating closure, one or more environmental conditions within the radiating closure and external to the radiating closure;
determining, with the one or more IoT-capable sensor devices, whether one or more sensor data corresponding to the monitored one or more environmental conditions exceed one or more corresponding predetermined thresholds; and
based on a determination that the one or more sensor data corresponding to the monitored one or more environmental conditions do not exceed one or more corresponding predetermined thresholds, preventing the one or more IoT-capable sensor devices from sending the one or more sensor data to one or more nodes.

2. The method of claim 1, wherein the radiating closure is one of an aerial radiating closure, a below grade radiating closure, or a buried radiating closure.

3. The method of claim 1, wherein receiving the first communications signal comprises receiving, with the signal distribution system, the first communications signal via one or more signal lines entering the radiating closure through one or more pass-throughs in at least one wall of the radiating closure, the one or more signal lines comprising at least one of one or more telecommunications lines, one or more broadband-over-power signal lines, one or more copper cable lines, one or more optical fiber lines, or one or more coaxial cable lines.

4. The method of claim 1, wherein directing the first communications signal to the one or more devices via the one or more wireless communications channels comprises directing, with the at least one of the one or more first antennas disposed within the radiating closure or the one or more second antennas embedded in the housing material of the radiating closure, the first communications signal to the one or more devices via the one or more wireless communications channels in multiple different directions.

5. The method of claim 1, wherein the one or more first antennas and the one or more second antennas each transmits and receives wireless broadband signals according to a set of protocols comprising at least one of IEEE 802.11a, IEEE 802.11b, IEEE 802.11g, IEEE 802.11n, IEEE 802.11ac, IEEE 802.11ad, or IEEE 802.11af.

6. The method of claim 1, wherein the one or more first antennas and the one or more second antennas each transmits and receives wireless broadband signals according to a set of protocols comprising at least one of Universal Mobile Telecommunications System ("UMTS"), Code Division Multiple Access ("CDMA"), Time Division Multiple Access ("TDMA"), Global System for Mobile Communication ("GSM"), Long Term Evolution ("LTE"), Personal Communications Service ("PCS"), Advanced Wireless Services ("AWS"), Emergency Alert System ("EAS"), Citizens Band Radio Service ("CBRS"), or Broadband Radio Service ("BRS").

7. The method of claim 1, wherein the one or more first antennas each comprises at least one of a plurality of lateral patch antennas, a plurality of arrays of patch antennas, one or more micro-strip patch antennas, a two-dimensional ("2D") leaky waveguide antenna, or a three-dimensional ("3D") array of antenna elements, wherein one or more of the at least one of the plurality of lateral patch antennas, the plurality of arrays of patch antennas, the one or more micro-strip patch antennas, the two-dimensional ("2D") leaky waveguide antenna, or the three-dimensional ("3D") array of antenna elements comprise flexible material that allows the one or more of the at least one of the plurality of lateral patch antennas, the plurality of arrays of patch antennas, the one or more micro-strip patch antennas, the two-dimensional ("2D") leaky waveguide antenna, or the three-dimensional ("3D") array of antenna elements to be bent while being disposed within the radiating closure.

8. The method of claim 1, wherein at least one of the one or more first antennas and the one or more second antennas comprises at least one active antenna element.

9. An apparatus, comprising:
a housing;
a signal distribution system, which is disposed within the housing, that receives a first communications signal;
a wireless transceiver, which is communicatively coupled to the signal distribution system, that sends the first communications signal, via one or more wireless communications channels, to one or more devices that are external to the housing;
at least one of one or more first antennas disposed within the housing or one or more second antennas embedded in a housing material of the housing that directs the first communications signal that is sent, via the one or more wireless communications channels, from the wireless transceiver to the one or more devices; and
one or more Internet of Things ("IoT") -capable sensor devices disposed within the housing, the one or more IoT-capable sensor devices each comprising:
one or more first sensors;
one or more first transceivers;
at least one first processor; and
a first non-transitory computer readable medium communicatively coupled to the at least one first processor, the first non-transitory computer readable medium having stored thereon computer software comprising a first set of instructions that, when executed by the at least one first processor, causes the IoT-capable sensor device to:
monitor, using the one or more first sensors, one or more environmental conditions within the apparatus and external to the apparatus;
determine whether one or more sensor data corresponding to the monitored one or more environmental conditions exceed one or more corresponding predetermined thresholds; and
based on a determination that the one or more sensor data corresponding to the monitored one or more environmental conditions does not exceed one or more corresponding predetermined thresholds prevent, with the one or more first transceivers and via machine-to-machine communications, sending the one or more sensor data to one or more nodes.

10. The apparatus of claim 9, wherein the apparatus is a radiating closure that forms a container.

11. The apparatus of claim 9, wherein the apparatus is a radiating closure that forms a lid of a container.

12. The apparatus of claim 9, wherein the housing material comprises at least one of metal or plastic.

13. The apparatus of claim 9, wherein the apparatus is a radiating closure, which is one of an aerial radiating closure, a below grade radiating closure, or a buried radiating closure.

14. The apparatus of claim 9, wherein receiving the first communications signal comprises receiving the first communications signal via one or more signal lines entering the apparatus through one or more pass-throughs in at least one wall of the housing, the one or more signal lines comprising at least one of one or more telecommunications lines, one or more broadband-over-power signal lines, one or more copper cable lines, one or more optical fiber lines, or one or more coaxial cable lines.

15. The apparatus of claim 9, wherein directing the first communications signal to the one or more devices via the one or more wireless communications channels comprises directing the first communications signal to the one or more devices via the one or more wireless communications channels in multiple different directions.

16. The apparatus of claim 9, wherein the one or more first antennas each comprises at least one of a plurality of lateral patch antennas, a plurality of arrays of patch antennas, one or more micro-strip patch antennas, a two-dimensional ("2D") leaky waveguide antenna, or a three-dimensional ("3D") array of antenna elements, wherein one or more of the at least one of the plurality of lateral patch antennas, the plurality of arrays of patch antennas, the one or more micro-strip patch antennas, the two-dimensional ("2D") leaky waveguide antenna, or the three-dimensional ("3D") array of antenna elements comprise flexible material that allows the one or more of the at least one of the plurality of lateral patch antennas, the plurality of arrays of patch antennas, the one or more micro-strip patch antennas, the two-dimensional ("2D") leaky waveguide antenna, or the three-dimensional ("3D") array of antenna elements to be bent while being disposed within the housing.

17. The apparatus of claim 9, wherein the signal distribution system comprises:
the wireless transceiver;
at least one second processor; and
a second non-transitory computer readable medium communicatively coupled to the at least one second processor, the second non-transitory computer readable medium having stored thereon computer software comprising a second set of instructions that, when executed by the at least one second processor, causes the signal distribution system to:
receive a first communications signal; and
send, using the wireless transceiver, the first communications signal to the one or more devices external to the housing via the one or more wireless communications channels.

18. The apparatus of claim 17, wherein the second set of instructions, when executed by the at least one second processor, further causes the signal distribution system to:
configure the at least one of the one or more first antennas disposed within the housing or the one or more second antennas embedded in the housing material of the housing to direct the first communications signal along one or more directions in order to send the first communications signal to the one or more devices.

* * * * *